(12) United States Patent
Connelly et al.

(10) Patent No.: US 11,535,910 B2
(45) Date of Patent: Dec. 27, 2022

(54) METHOD FOR PREPARING A LEACH FEED MATERTIAL

(71) Applicant: TNG LIMITED, Subiaco (AU)

(72) Inventors: Damian Edward Gerard Connelly, South Perth (AU); Denis Stephen Yan, Morley (AU)

(73) Assignee: TNG LIMITED, Subiaco (AU)

( * ) Notice: Subject to any disclaimer, the term of this patent is extended or adjusted under 35 U.S.C. 154(b) by 560 days.

(21) Appl. No.: 16/494,567

(22) PCT Filed: Apr. 4, 2018

(86) PCT No.: PCT/AU2018/050310
§ 371 (c)(1),
(2) Date: Sep. 16, 2019

(87) PCT Pub. No.: WO2018/184067
PCT Pub. Date: Oct. 11, 2018

(65) Prior Publication Data
US 2020/0131600 A1    Apr. 30, 2020

(30) Foreign Application Priority Data

Apr. 5, 2017 (AU) .............................. 2017901240

(51) Int. Cl.
C22B 5/10    (2006.01)
C22B 3/10    (2006.01)
C22B 34/22   (2006.01)

(52) U.S. Cl.
CPC ............... *C22B 5/10* (2013.01); *C22B 3/10* (2013.01); *C22B 34/22* (2013.01)

(58) Field of Classification Search
CPC .............. C22B 5/10; C22B 3/10; C22B 34/22

USPC ........................................................... 423/68
See application file for complete search history.

(56) References Cited

U.S. PATENT DOCUMENTS

| 1,733,700 A | 10/1929 | Stevens et al. |
| 3,151,933 A | 10/1964 | Hazen et al. |
| 2016/0060728 A1 | 3/2016 | Qi et al. |

FOREIGN PATENT DOCUMENTS

| BR | 8 201 050 A | 10/1983 | |
| CA | 1047255 A * | 1/1979 | ......... C21B 13/0046 |
| WO | WO-2011094858 A1 * | 8/2011 | ............. C22B 11/04 |

OTHER PUBLICATIONS

Extended Search Report issued for European Patent Application No. 18780408.3 dated Mar. 12, 2021, 7 pages.
International Search Report and Written Opinion issued for PCT Application No. PCT.AU2018/050310 dated Jun. 5, 2018, 8 pages.

* cited by examiner

*Primary Examiner* — Melissa S Swain
(74) *Attorney, Agent, or Firm* — Rothwell, Figg, Ernst & Manbeck, P.C.

(57) ABSTRACT

A method (10) for preparing a leach feed material, the method (10) comprising the steps of:
  passing an ore or concentrate containing vanadium and iron to a reduction step (12) to form a reduced ore or concentrate; and
  passing the reduced ore or concentrate to a ferric leach step (14) to produce a ferric leachate containing iron and a ferric leach residue containing vanadium,
wherein the ferric leach residue is suitable for use as the leach feed material for extracting and recovering vanadium.

22 Claims, 11 Drawing Sheets

METHOD FOR PREPARING A LEACH FEED MATERTIAL

CROSS REFERENCE TO RELATED APPLICATION

This application is a 35 U.S.C. 371 National Phase Entry Application from PCT/AU2018/050310 filed Apr. 4, 2018, which claims the benefit of Australian Patent Application No. 2017901240 filed on Apr. 5, 2017, the disclosures of which are incorporated by reference in their entirety.

FIELD OF THE INVENTION

The present invention relates to a method for preparing a leach feed material. More particularly, the method of the present invention is intended to provide an improved quality the leach feed material through the removal of an amount of iron from a vanadium containing ore or concentrate. Still more particularly, the leach feed material is suitable for use in a process for the extraction and recovery of vanadium from titanomagnetite-type ores.

BACKGROUND ART

Traditionally, vanadium is extracted and recovered from its ores through a pyrometallurgical process that involves a salt roasting step followed by water leaching. It is generally known in the art that the salt roasting step can pose issues in the processing of vanadium bearing titanomagnetites. Namely the performance of each ore is quite variable with the process requiring extensive optimisation. Alternatively, the ore is concentrated to form an iron ore concentrate and sold to or passed onto a blast furnace or smelting operation that credits the vanadium content of the feed. The vanadium and titanium report to the slag during the modified iron making process, in which the vanadium can then be extracted through a salt roast process. Both of these processes fail to unlock the full value of the metals contained in the ore.

International Patent Application PCT/AU2011/000519 (WO 2011/143689) describes an alternative hydrometallurgical process for extracting vanadium from titanomagnetite-type ores. The process described in Application PCT/AU2011/000519 utilises a combination of acid leaching, solvent extraction and stripping to selectively recover valuable metals. Application PCT/AU2011/000519 further describes a leach feed material comprising an amount of iron, wherein said iron is co-extracted with vanadium. Iron is co-extracted with vanadium in the acid leaching step since vanadium is locked within the titanomagnetite matrix. The iron is then carried along with the vanadium to the solvent extraction and stripping stages to be subsequently removed.

Minimising the amount of iron or any other gangue material in the leach feed material is beneficial for improving the overall extraction and recovery of vanadium. Furthermore, improving the quality of the leach feed material minimises operating costs and capital expenditure, as additional process steps for handling significant amounts of iron downstream after the leach step are substantially avoided.

The method of the present invention has as one object thereof to overcome substantially the abovementioned problems of the prior art, or to at least provide a useful alternative thereto.

Throughout the specification, unless the context requires otherwise, the word "comprise" or variations such as "comprises" or "comprising", will be understood to imply the inclusion of a stated integer or group of integers but not the exclusion of any other integer or group of integers.

Throughout the specification, unless the context requires otherwise, the word "contain" or variations such as "contains" or "containing", will be understood to imply the inclusion of a stated integer or group of integers but not the exclusion of any other integer or group of integers.

Each document, reference, patent application or patent cited in this text is expressly incorporated herein in their entirely by reference, which means that it should be read and considered by the reader as part of this text. That the document, reference, patent application, or patent cited in this text is not repeated in this text is merely for reasons of brevity.

Reference to cited material or information contained in the text should not be understood as a concession that the material or information was part of the common general knowledge or was known in Australia or any other country.

DISCLOSURE OF THE INVENTION

In accordance with the present invention there is provided a method for preparing a leach feed material, the method comprising the steps of:
 passing an ore or concentrate containing vanadium and iron to a reduction step to form a reduced ore or concentrate; and
 passing the reduced ore or concentrate to a ferric leach step to produce a ferric leachate containing iron and a ferric leach residue containing vanadium,
wherein the ferric leach residue is suitable for use as the leach feed material for extracting and recovering vanadium.

In one form of the present invention the ore or concentrate contains titanium in addition to vanadium and iron.

The reduction step is preferably conducted using a carbon reductant.

Preferably, the carbon reductant is coke. More preferably, the concentration of coke, expressed as a ratio to the stoichiometric amount of carbon required for iron reduction, is between about 0.8 to 6.5.

Still preferably, the concentration of coke is between about 0.8 to 1.2.

Without being bound by theory, the carbon:sample ratio, which is referred to as a ratio of the stoichiometric amount of carbon, is calculated by using the average composition of a titanomagnetite, which for example may be $4FeO.3Fe_2O_3.2TiO_2$, together with the following reactions:

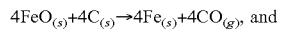

$4FeO_{(s)}+4C_{(s)} \rightarrow 4Fe_{(s)}+4CO_{(g)}$, and

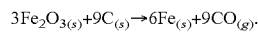

$3Fe_2O_{3(s)}+9C_{(s)} \rightarrow 6Fe_{(s)}+9CO_{(g)}$.

From these reactions and the composition of the titanomagnetite, the stoichiometric ratio of carbon is 0.153 (mass of carbon:mass of concentrate).

Still preferably, the reduction step is conducted at a temperature range of between about 900° C. to 1200° C. More preferably, the reduction step is conducted at a temperature range of between about 1000° C. to 1100° C.

The residence time of the reduction step preferably ranges about 1 to 3 hours. More preferably, the residence time of the reduction step is about 2 hours.

In one embodiment, the reduction step may be conducted using reformed natural gas.

Preferably, the percentage of metallised iron in the reduced ore or concentrate is between about 50 to 100%.

The ferric leach step is preferably conducted with ferric chloride.

Preferably, the concentration of ferric chloride ranges between about 20 to 40% w/w. More preferably the concentration of ferric chloride ranges between about 25 to 35% w/w. Still preferably, the concentration of ferric chloride is about 35% w/w.

Still preferably, the ferric leach step is conducted at a temperature ranging between about 25° C. to 100° C. under atmospheric pressure. More preferably, the ferric leach step is conducted at a temperature ranging about 60° C. to 80° C. under atmospheric pressure. The residence time of the ferric leach step preferably ranges between about 1 to 5 hours. More preferably, the residence time ranges between about 1 to 3 hours.

The solids content during the ferric leach step preferably ranges between about 5 to 20% w/w. More preferably, the solids content ranges between about 8 to 14% w/w.

It will be appreciated by those skilled in the art that the solids content during the ferric leach step will be dependent on the amount of reduced iron in the reduced ore or concentrate and the solubility of any ferrous chloride that is formed during the ferric leach step.

In one embodiment, the present invention may further comprise the step of:
passing the ferric leach residue to an acid leach step to produce an acid leachate containing vanadium and an acid leach residue.

Preferably, the acid leach residue contains titanium.

The acid leach step is preferably conducted using hydrochloric (HCl) acid. More preferably, the concentration of HCl acid ranges between about 15% to 32% (w/w). Still preferably, the concentration of HCl acid ranges between about 15% to 20%.

The acid leach step may be conducted under atmospheric pressure or under pressure. The acid leach step under atmospheric pressure is preferably conducted at a temperature ranging between about 25° C. to 100° C. Still preferably, the acid leach step under atmospheric pressure is preferably conducted at a temperature ranging between about 60° C. to 80° C.

In a further embodiment, the present invention may further comprise the additional steps of:
passing the acid leachate to a neutralising step to form a neutralised leachate containing vanadium;
passing the neutralised leachate to a further reduction step to form a reduced leachate containing vanadium; and
passing the reduced leachate to an extraction and/or recovery step.

In one form of the present invention, the percentage of metallised iron in the reduced ore or concentrate preferably ranges between about 50 to 70% for an acid leach step conducted under atmospheric pressure, or between about 70 to 100% for an acid leach step conducted under pressure.

The acid leach step conducted under pressure is preferably conducted at a temperature ranging between about 120° C. to 160° C., more preferably a temperature ranging between about 140° C. and 160° C.

The residence time of the acid leach step conducted under atmospheric pressure preferably ranges between about 0.5 to 10 hours. More preferably, the residence time of the acid leach step under atmospheric pressure ranges between about 6 and 8 hours.

Preferably, the acid leach step conducted under pressure has a residence time ranging between about 0.5 to 4 hours. More preferably, the acid leach step conducted under pressure has a residence time ranging between about 0.5 to 2 hours.

The solids content during the acid leach step is preferably ranging between about 10 to 30% w/w. More preferably, the solids content during the acid leach step ranging between about 15 to 20% w/w.

It will be appreciated by those skilled in the art that the conditions of the acid leach step, for example the concentration of HCl acid, the residence time and the solids content, are adjusted to minimise the free acid at the end of the acid leach step. Preferably, the free acid concentration at the end of the acid leach step ranges between about 10 to 40 g/L.

The neutralising step is preferably conducted using magnesium oxide (MgO). More preferably, the amount of MgO used ranges about 6.5 to 11.1 kg/m$^3$ (kg MgO/m$^3$ of the acid leachate). Still preferably, the amount of MgO is added to achieve a pH of about −0.4 to 2 with respect to the neutralised leachate. More preferably, the pH is between about 0 to 0.7.

Still preferably, the neutralising step is conducted at a temperature range of between about 40° C. to 60° C. More preferably, the neutralising step is conducted at about 40° C.

The further reduction step is preferably conducted using aluminium (Al) or iron (Fe) filings. More preferably, iron fillings are used at a concentration range of between about 1.2 to 1.4 times the stoichiometric amount of iron. More preferably, iron fillings are used at a concentration of 1.2 times the stoichiometric amount of iron.

The extraction step may comprise a solvent extraction step and a stripping step.

Preferably, the solvent extraction step comprises the extraction of vanadium onto an organic extractant, to form a loaded organic extractant.

Preferably, the organic extractant contains a phosphine oxide. Preferably, the phosphine oxide is Cyanex 272™.

Still preferably, the organic extractant comprises about 20% v/v Cyanex 272™ and 80% v/v organic solvent.

Preferably, the organic to aqueous ratio (O:A) during the solvent extraction step ranges between about 1:1 and 1:4, more preferably about 1.4.

It will be appreciated by those skilled in the art that the method of the present invention may comprise one or more solvent extraction steps for extracting vanadium into the organic extractant.

Still preferably, the solvent extraction step is conducted at a temperature range of between about 35° C. to 45° C., more preferably the temperature is about 40° C.

In one form of the invention, there is provided a scrubbing step after the solvent extraction step, whereby the scrubbing step produces a scrubbed organic extractant.

Without being bound by theory the scrubbing step substantially removes aluminium (Al) and other impurities from the loaded organic extractant, for producing a substantially high purity vanadium product Preferably, the scrubbing step is conducted at a pH range of about 1.4 to 1.6.

Still preferably, the organic to aqueous ratio (O:A) during the scrubbing step ranges about 10:1 to 15:1.

Preferably, the scrubbing step is conducted using a scrubbing agent.

Preferably, the scrubbing agent is in the form of a loaded strip liquor produced in the stripping step. Still preferably, the scrubbing agent is diluted by a ratio of 50 times the concentration of a strip liquor used in the stripping step.

The stripping step is preferably conducted after the scrubbing step, whereby vanadium is stripped from the scrubbed organic extractant, thereby forming the loaded strip liquor.

Preferably, the stripping step is conducted using HCl acid, wherein the concentration of HCl acid ranges about 3 to 5 M.

Preferably, the O:A ratio during the stripping step is about 13:1.

It will be appreciated by those skilled in the art that the method of the present invention may comprise one or more stripping steps for stripping vanadium from the scrubbed organic extractant.

In one form of the invention, there is provided an organic cleaning step after the stripping step, whereby a portion of the loaded strip liquor is treated with HCl acid, thereby forming a cleaned organic extractant.

Without being bound by theory the organic cleaning step substantially removes trace impurities extracted and retained on the organic extractant during the scrubbing and stripping steps. The cleaned organic extractant may then be reused in subsequent solvent extraction steps.

A portion of the loaded strip liquor produced in the stripping step is preferably passed to the recovery step for recovering a vanadium product.

The purity of the vanadium product is preferably greater than 93%. More preferably, the purity of the vanadium product ranges between about 99.3% to 99.7%.

DESCRIPTION OF THE DRAWINGS

The present invention will now be described, by way of example only, with reference to several embodiments thereof and the accompanying drawings, in which:—

BEST MODE(S) FOR CARRYING OUT THE INVENTION

Figure 1:
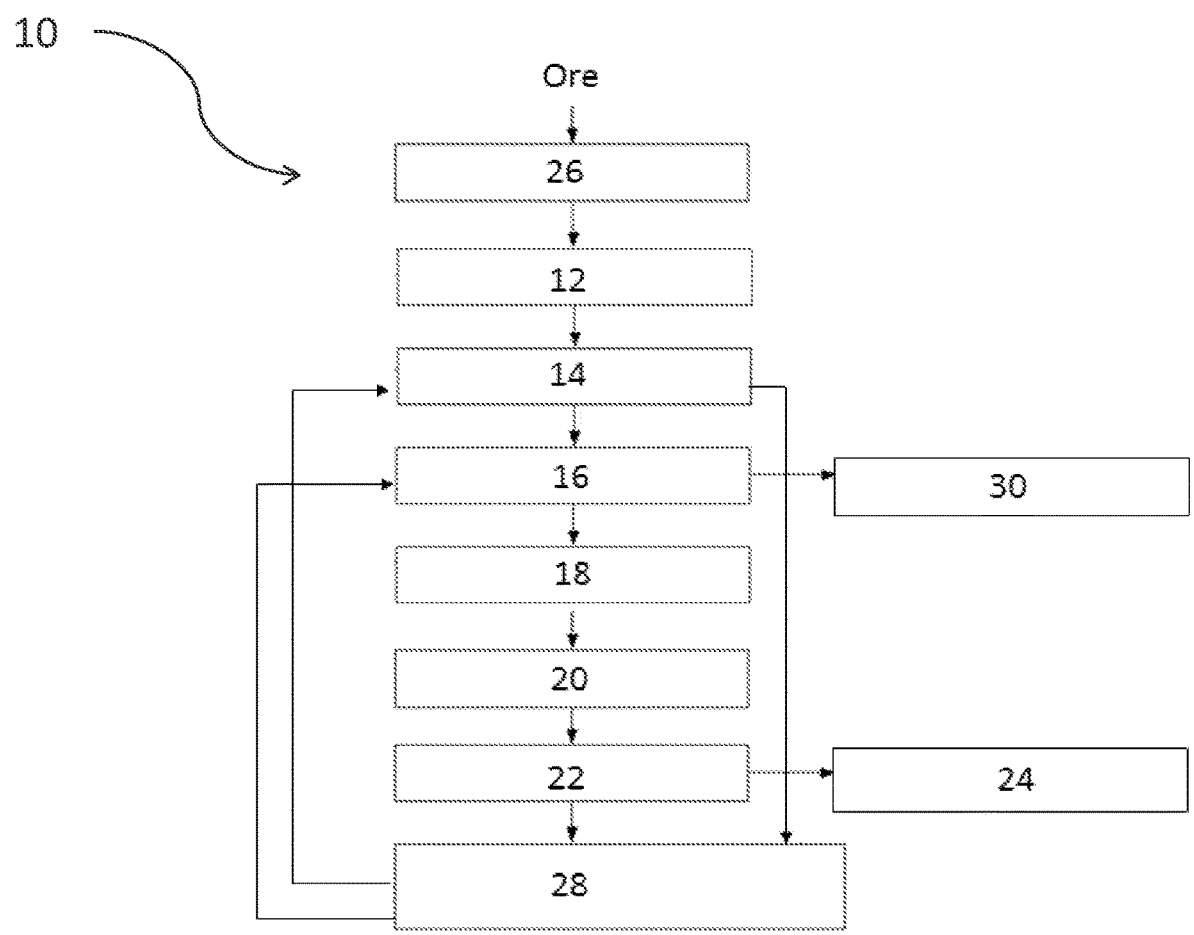
FIG. 1 is a flow sheet depicting a method for preparing a leach feed material for extracting and recovering vanadium from its ores in accordance with the present invention, together with several additional process steps in accordance with additional embodiments of the present invention.

In FIG. 1 there is shown a method 10 for preparing a leach feed material in accordance with a first embodiment of the present invention, together with several additional process steps in accordance with additional embodiments of the present invention. The so prepared leach feed material is intended to be suitable for extracting and recovering vanadium from titanomagnetite-type ores.

The method 10 comprises a reduction step 12 and a ferric leach step 14. In accordance with a second embodiment of the present invention, the method 10 further comprises an acid leach step 16. In accordance with a third embodiment of the present invention the method further comprises a neutralising step 18, a further reduction step 20, an extraction step 22 and/or a recovery step 24.

Prior to the reduction step 12 there is provided a pre-processing circuit 26, wherein the pre-processing circuit 26 comprises a crushing and beneficiation circuit (not shown). The purpose of the pre-processing circuit 26 is to produce a crushed ore with a size that is amenable for subsequent cobbing or magnetic separation.

The crushed ore from the crushing circuit 26 is beneficiated using a magnetic separator (not shown) to form a magnetic concentrate. Tails from the magnetic separation are passed to a tailings thickening step (not shown), while the magnetic concentrate, which comprises vanadium, iron and titanium, is then dewatered and passed to the reduction step 12.

In the reduction step 12 the iron is partially reduced to metallic iron or Fe(0). The reduction step 12 is conducted by adding coke as a reducing agent to the magnetic concentrate, wherein the concentration of the coke ranges between about 0.8 to 6.5, for example 0.8 to 1.2, times the stoichiometric amount of carbon, as discussed hereinbefore. In another form of the invention, the reduction step can be conducted using reformed natural gas as the reducing agent.

The reduction step 12 is conducted at a temperature range of between about 900° C. to 1200° C., for example about 1080° C., and for a residence time ranging between about 1 to 3 hours, for example about 2 hours. The product of the reduction step 12 is a reduced concentrate comprising metallic iron or Fe(0). The reduced concentrate is then passed to the ferric leach step 14.

The purpose of the ferric leach step 14 is to substantially remove the metallic iron present in the reduced concentrate, thereby minimising the amount of iron that is carried through to the subsequent acid leach step 16 and other downstream processes.

Specifically, the reduced concentrate is passed to the ferric leach step 14 in order to produce a ferric leach residue that is substantially depleted in iron and containing vanadium and titanium. The ferric leach step 14 is conducted by adding ferric chloride to the reduced concentrate, wherein the concentration of the ferric chloride ranges between about 20% to 40% w/w, for example about 35% w/w. The ferric leach step 14 is conducted at a temperature range of between about 25° C. to 100° C., for example between about 60° C. to 80° C., under atmospheric pressure, and for a residence time of between about 1 to 5 hours, for example about 1 to 3 hours. In addition, the ferric leach step 14 is conducted at between about 5% to 20% w/w solids content, for example between about 8 to 14% solids content, or in one form at about 12% w/w solids content.

A ferric leachate produced from the ferric leach step 14 is passed to a regeneration circuit 28 for the purpose of regenerating ferric chloride for use in subsequent ferric leach steps 14, while the ferric leach residue is passed, in accordance with the second embodiment of the present invention, to the acid leach step 16 for the purpose of extracting and ultimately recovering value metals, including vanadium.

The acid leach step 16 is conducted using hydrochloric (HCl) acid. The HCl acid concentration during the acid leach step 16 is substantially maintained at concentration ranging between about 15% to 32% w/w, for example between about 15% to 20% w/w.

The acid leach step 16 under atmospheric pressure is conducted at a temperature range of about 25° C. to 100° C., for example about 60° C. to 80° C., while the acid leach step under pressure is conducted at a temperature range of between about 120° C. to 160° C., for example between about 140° C. and 160° C.

The residence time of the acid leach step under atmospheric pressure ranges about 0.5 to 10 hours, for example about 6 and 8 hours, while the acid leach step under pressure has a residence time ranging between about 0.5 to 4 hours, for example between about 0.5 to 2 hours.

The acid leach step 16 is conducted at about 10% to 30% w/w solids content, for example between about 15 to 20% w/w solids content.

The acid leach step 16 produces an acid leachate containing vanadium and an acid leach residue containing titanium. The acid leach residue containing titanium is optionally passed to a titanium processing circuit 30 in order to produce pigment grade titanium dioxide and, in accordance with the third embodiment of the present invention, the acid leachate is passed to the neutralising step 18.

In the neutralising step 18, the pH of the acid leachate is reduced by cooling the acid leachate produced from the acid leach step 16, between 50 to 60° C., for example 60° C., followed by neutralisation with one of sodium hydroxide, ammonia or magnesium oxide to a pH of between about −0.4 to 2.

The neutralising step when conducted with magnesium oxide, uses MgO at a concentration ranging between about 6.5 to 11.1 kg/m$^3$ (kg MgO/m$^3$ of the acid leachate). The amount of MgO is added to achieve a pH of about −0.4 to 2, for example, 0 to 0.7 with respect to the neutralised leachate. Additionally, the neutralising step is conducted at a temperature range of between about 40° C. to 60° C., for example about 40° C.

Without being bound by theory, this adjustment of the pH acts to neutralise any free acid to prevent the hydrogen evolution during the further reduction step 20 that follows the neutralising step 18.

In the further reduction step 20, iron (Fe) filings are added to the neutralised leachate that is formed as a result of the neutralising step 18. The iron fillings are added at a concentration of about 1.2 to 1.4 times the stoichiometric amount of iron required to reduce the oxidation state of iron from Fe(III) to Fe(II) and V(V) to V(IV) or V(III). Alternatively, the further reduction step 20 is conducted using aluminium (Al) fillings.

As a result of the further reduction step 20, a reduced leachate is formed, wherein the vanadium is in the form of V(IV) or V(III). The reduced leachate is then passed to the extraction step 22, comprising at least a solvent extraction and stripping step (not shown).

In the solvent extraction step 22, the reduced vanadium product is mixed with an organic extractant, for example a phosphine oxide. Specifically, the extractant is provided in the form of a mix of 20% v/v Cyanex 272™ in Shellsol D70™. The extraction is conducted at an organic to aqueous (O:A) ratio ranging about 1:1 and 1:4. In this step, vanadium is extracted onto the organic extractant.

A loaded organic extractant is then transferred to a stripping step 22, in which the vanadium is stripped. The vanadium is stripped from the loaded organic extractant using HCl of between about 3 M to 5 M, for example 4M HCl. The O:A ratio during the stripping step 22 is about 13:1. This produces a loaded strip liquor having a vanadium concentration of about 90 g/L. The loaded strip liquor is then pumped to a recovery step 24, for example a vanadium precipitation step for the production of vanadium pentoxide ($V_2O_5$).

The vanadium precipitation step in conducted at a temperature ranging between about 25° C. to 80° C., for example 65° C. to 80° C. and a pH ranging between about −0.4 to 0.2. The oxidation-reduction potential (ORP) of the loaded strip liquor during the precipitation step was >250 mV (Pt with Ag/AgCl reference), for example, 1000 mV to 1100 mV.

The remaining liquor from the solvent extraction step 22 is sent to the regeneration circuit 28, whereby HCl acid can be regenerated. The regenerated HCl acid has a strength of about 18% w/w and is collected for re-use in subsequent acid leach steps 16. Furthermore, iron is precipitated as hematite, being the iron-containing product.

In one form of the invention, there is provided a scrubbing step (not shown) after the solvent extraction step 22, whereby the scrubbing step produces a scrubbed organic extractant. Without being bound by theory the scrubbing step substantially removes aluminium (Al) and other impurities from the loaded organic extractant, for producing a substantially high purity vanadium product The scrubbing step is conducted at a pH range of about 1.4 to 1.6 and at an organic to aqueous ratio (O:A) ranging about 10:1 to 15:1. The scrubbing step is conducted using a scrubbing agent in the form of a loaded strip liquor produced in the stripping step. Still preferably, the scrubbing agent is diluted by a ratio of 50 times the concentration of a strip liquor used in the stripping step.

The stripping step 22 is conducted after the scrubbing step, whereby vanadium is stripped from the scrubbed organic extractant, thereby forming the loaded strip liquor.

In one form of the invention, there is provided an organic cleaning (not shown) step after the stripping step, whereby a portion of the loaded strip liquor is treated with HCl acid, thereby forming a cleaned organic extractant. Without being bound by theory the organic cleaning step substantially removes trace impurities extracted and retained on the organic extractant during the scrubbing and stripping steps. The cleaned organic extractant may then be reused in subsequent solvent extraction steps.

A portion of the loaded strip liquor produced in the stripping step 22 is passed to the above-mentioned recovery step 24 for recovering a vanadium product.

The method 10 of the present invention will now be described with reference to several non-limiting examples.

A metallurgical test work programme was based on an ore from the Mount Peake project in the Northern Territory of Australia, the project having an Inferred Resource of 160 Mt @ 0.28% $V_2O_5$, 5.0% $TiO_2$ and 23% iron.

Iron Reduction Bench Scale Test Work

A vanadium rich concentrate ($P_{80}$ 40, 90, 170 and 200 μm) originating from a magnetic separation process was subjected to a reduction step to determine the impact of carbon ratio, reduction time and temperature on the metallisation of iron in the concentrate and downstream processes. The majority of the test work was undertaken on the 90 μm material. The composition of the vanadium rich concentrate is as depicted in Table 1 below.

TABLE 1

Composition of the vanadium rich concentrate

| Grind Size | Concentrate Grade (%) | | | | | | |
|---|---|---|---|---|---|---|---|
| (mm) | Fe | $V_2O_5$ | $TiO_2$ | $SiO_2$ | $Al_2O_3$ | P | S |
| 0.2 | 50.3 | 1.05 | 15.95 | 6.5 | 3.25 | 0.01 | 0.033 |
| 0.09 | 54.5 | 1.15 | 16.45 | 2.6 | 2.63 | 0.003 | 0.044 |
| Head Assay | 29.5 | 0.238 | 7.57 | 29.1 | 5.99 | 0.082 | 0.024 |

The concentrate was reduced with coke at temperatures of 900 to 1200° C. for 3 hours in a rotating batch pot. The reduction conditions tested are set out in Table 2 below.

TABLE 2

Iron Reduction Test Conditions

| Test | Sample mass (g) | Coke mass (g) | Carbon stoic. ratio | Air (L/min) | Temp (° C.) | Time (hr) |
|---|---|---|---|---|---|---|
| Run 1 | 100 | 33.3 | 2.2 | 0.4 | 1000 | 3 |
| Run 2 | 100 | 33.2 | 2.2 | 0.4 | 1100 | 3 |
| Run 3 | 100 | 100 | 6.5 | 0.4 | 1000 | 3 |
| Run 4 | 100 | 100 | 6.5 | 0.4 | 900 | 3 |
| Run 4B | 100 | 300 | 6.5 | nil | 900 | 1 |
| Run 5 | 100 | 100 | 6.5 | 0.4 | 1100 | 3 |
| Run 6 | 100 | 100 | 6.5 | 0.4 | 1200 | 3 |
| Run 7 | 100 | 100 | 6.5 | 0.4 | 1050 | 3 |

A Scanning Electron Microscopy (SEM) was used to analyse the reduced concentrate samples produced from the iron reduction bench scale test work conducted at 1000 and 1050° C. and the ferric chloride leach residues produced from a subsequent ferric leach.

Figure 2:
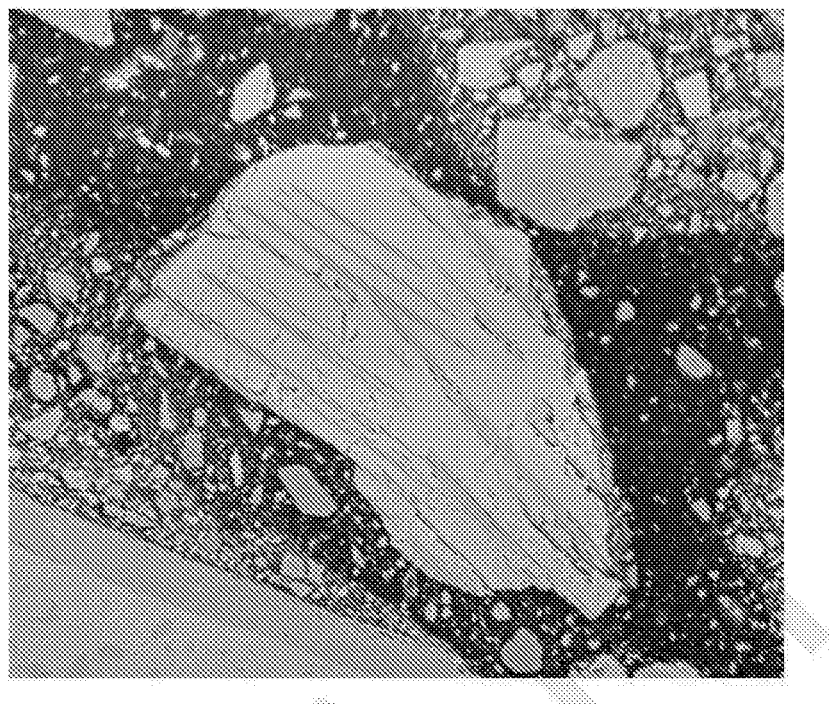
FIG. 2 is a Scanning Electron Microscope (SEM) micrograph of a concentrate showing ilmenite lathes with a titanomagnetite grain.

FIG. 2 shows a SEM micrograph of the magnetic concentrate before the iron reduction step. The ilmenite needles are dark grey within the lighter grey being titanomagnetite.

Figure 3:
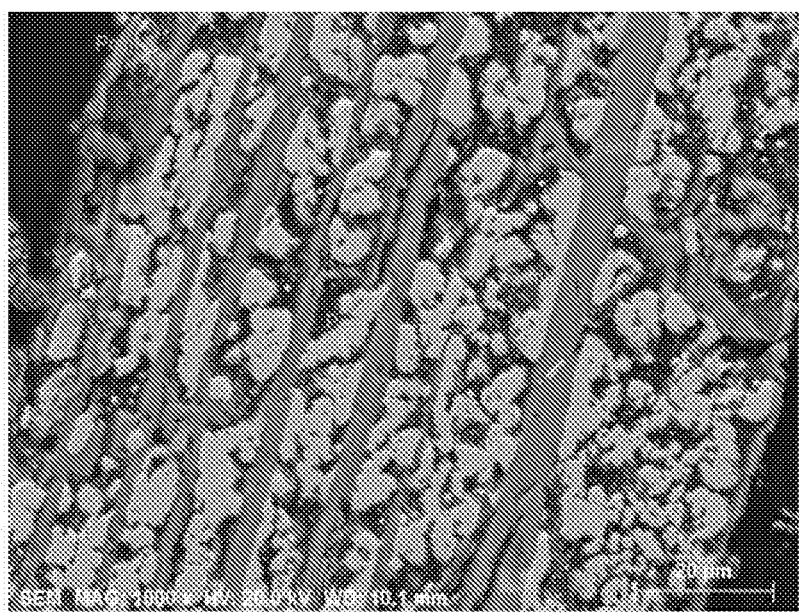
FIG. 3 is an SEM micrograph of a magnetic concentrate reduced with coke at 1000° C.

FIG. 3 shows a SEM micrograph of the magnetic concentrate after reduction at 1000° C. The micrograph shows the ilmenite needles, intact and unreduced (points 6 and 8) with reduced metallic iron (point 5).

Figure 4:
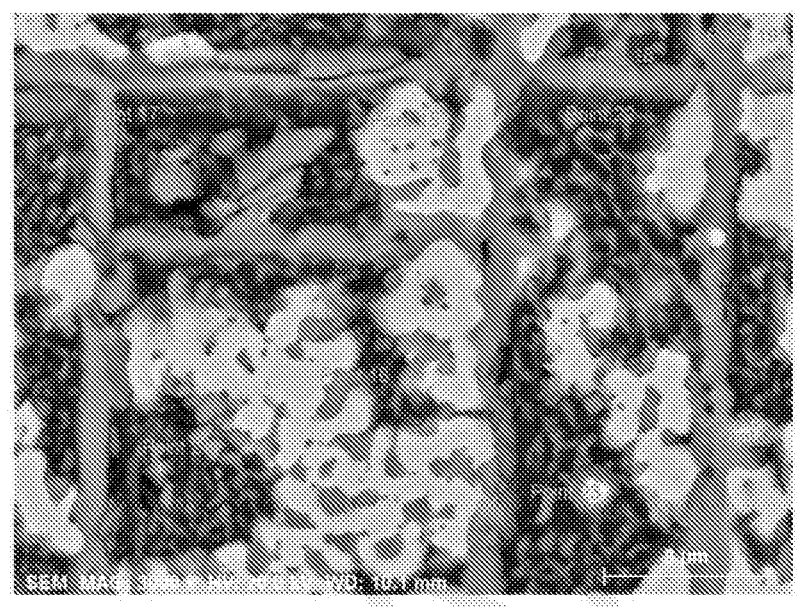
FIG. 4 is the reduced concentrate of FIG. 3 showing detail of the formation of metallic iron between ilmenite lathes.

FIG. 4 shows detail around the formation of the metallic iron between the ilmenite lathes.

Without being bound by theory, it is understood that as the concentrate is reduced and metallic iron is formed, the titanium diffuses away, enriching the surrounding oxides and forming various higher titanium oxides including ilmenite, rutile and pseudobrookite.

The spot SEM analysis of the points in FIG. 3 and FIG. 4 are given in Table 3 with an approximate compound composition.

TABLE 3

Estimated Compound from Energy Dispersive X-Ray Point Analysis Reduced at 1000° C.

| Point | % Ti | % V | Compound |
|---|---|---|---|
| 5 | 3.1 | — | Fe |
| 6 | 34.1 | 1.3 | $FeTiO_3$ |
| 7 | 17.3 | 1.4 | $Fe_3TiO_6$ |
| 8 | 33.6 | 1.3 | $FeTiO_3$ |
| 15 | 4.2 | — | Fe |
| 16 | 21.9 | 1 | $Fe_2TiO_3$ |
| 17 | 31.1 | 1.5 | $FeTiO_3$ |
| 18 | 28.6 | 1.2 | $FeTiO_3$ |
| 19 | 37.8 | 2 | $FeTiO_3$ |
| 20 | 37 | 2.1 | $FeTiO_2$ |
| 21 | 17.6 | 0.7 | $Fe_3TiO_3$ |
| 22 | 33.7 | 2.4 | $FeTi_2O_8$ |
| 23 | 24.7 | 1.8 | $FeTiO_4$ |

The results in Table 3 demonstrate that the metallic iron contains a small amount of titanium but no vanadium. Thus, it is concluded that the vanadium in the concentrate is not reduced under the bench scale test conditions but is concentrated in the various titanium iron oxides.

The iron reduction tests described above were carried out at carbon:iron ratios that were in carbon excess to ensure there was sufficient carbon to reduce the maximum amount of iron. These ratios were 2.2 and 6.5 times the stoichiometric amount of carbon (subsequently referred to as 2.2 C or 6.5 C).

The stoichiometric amount of carbon was calculated on the basis of the estimated iron oxide composition of the magnetic concentrate; $Fe_5TiO_{8.5}$ or $4FeO.3Fe_2O_{3.2}TiO_2$ and the following reactions:

$$4FeO_{(s)} + 4C_{(s)} \rightarrow 4Fe_{(s)} + 4CO_{(g)} \text{ and}$$

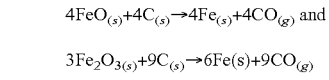

According to these reactions, the stoichiometric ratio of C:Fe is 0.280 or a carbon:sample weight ratio of 0.153.

Run 1 and Run 2 reduction tests used a carbon:sample ratio of 2.2 C at 1000° C. and 1100° C. (see Table 2). However, a weak HCl (3%) leach, used to indicate metallic iron, suggested a very low metallisation of the iron. Without being bound by theory, it is believed that this low iron metallisation was due to small air flow of 0.4 L/min used which was burning off the small amount of carbon and not leaving enough for the reduction. For the next reduction test work, the carbon:sample ratio was increased to 6.5 C.

Using a carbon:sample ratio of 6.5 times the stoichiometric amount, the reduction temperature was varied between 900° C. and 1200° C. for a 3 hour reduction time. The preferred reduction temperature was selected based on the result of a ferric chloride leach of the reduced concentrate. The weak HCl (3%) leach was performed to provide an estimate of the percentage of metallic iron in the reduced concentrate and, as such, was used to optimise the conditions of the reduction step.

Figure 5:
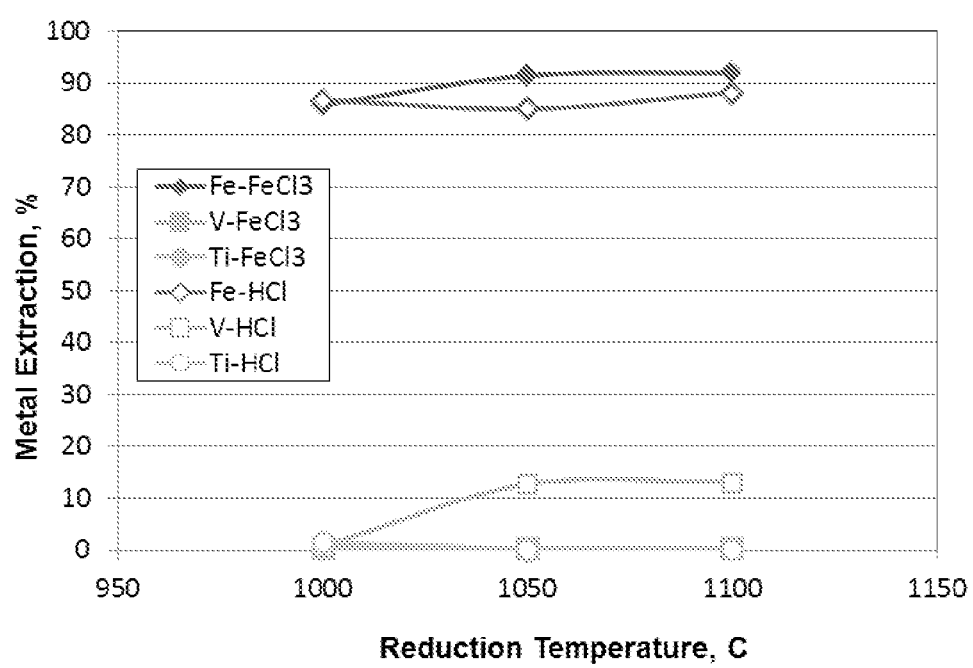
FIG. 5 is a graph of the extraction of iron, vanadium and titanium in a weak HCl (3%) leach and a ferric chloride leach as a function on the reduction temperature.

FIG. 5 is a graph of the extraction of iron, vanadium and titanium in a weak HCl (3%) leach and a ferric leach as a function on the reduction temperature. FIG. 5 shows that the weak HCl (3%) leach provides a good indication of the dissolvable iron in the reduced concentrate and further provides that weak acid leach can dissolve components other than metallic iron. For example, up to 13% vanadium was also leached from reduction test work carried out above 1050° C., which was not leached in ferric chloride. This is a positive result in that the vanadium is not leached in ferric chloride, but had a slight dissolution in weak HCl (3%).

Ferric Chloride Bench Scale Test Work

Ferric chloride leaching bench scale test work was performed on samples taken from the iron reduction test work. Specifically, magnetic concentrates, which has been reduced at 1000° C., 1050° C. and 1100° C., were leached in ferric chloride solution to remove the metallic iron and determine the deportment of the vanadium and titanium.

Figure 6:
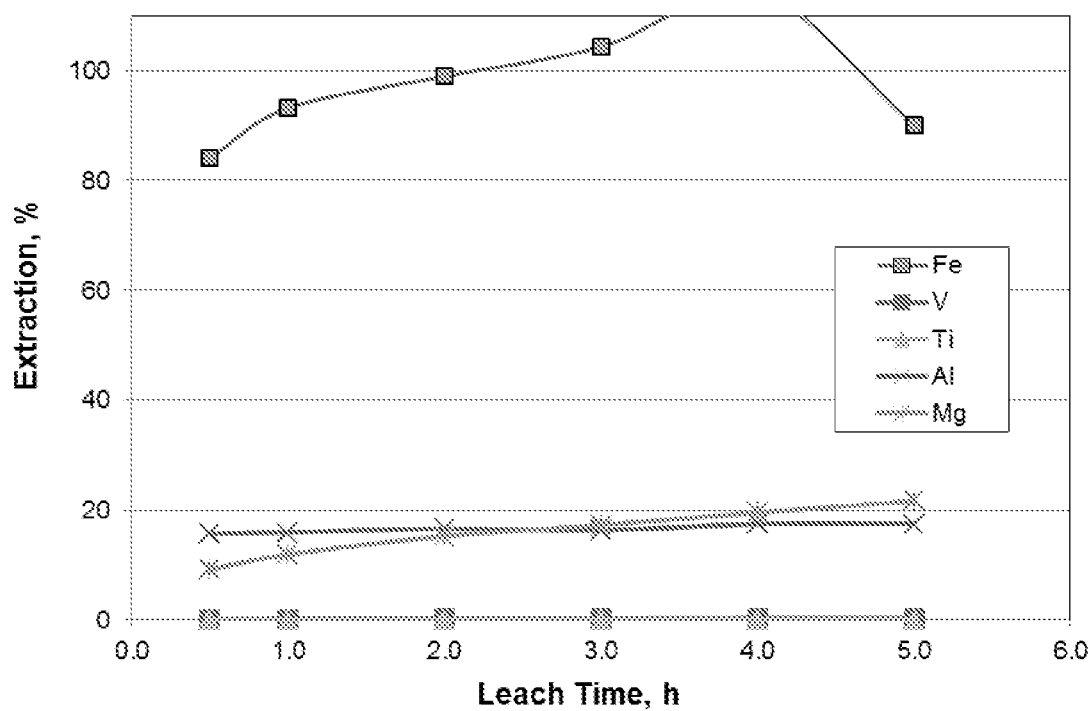
FIG. 6 is a graph of the extraction of iron, vanadium, titanium, aluminium and magnesium from a reduced concentrate reduced at 1050° C. using a ferric chloride leach of 35% w/w $FeCl_3$ and at 80° C.

FIG. 6 shows the leach extraction of iron and other metals from a concentrate reduced at 1050° C. The leach conditions were 35% w/w ferric chloride at 80° C. over a period of 5 hours. The results show that over 90% of the iron is extracted after 1 hour of leaching. About 20% of the aluminium and magnesium is also leached with minimal extraction of the titanium (<0.04%) and vanadium (<0.5%). Extractions over 100% were due to assay errors. Thus, the leach residue retains some of the iron and the majority of the titanium and vanadium in various iron-titanium oxide phases.

Figure 7:
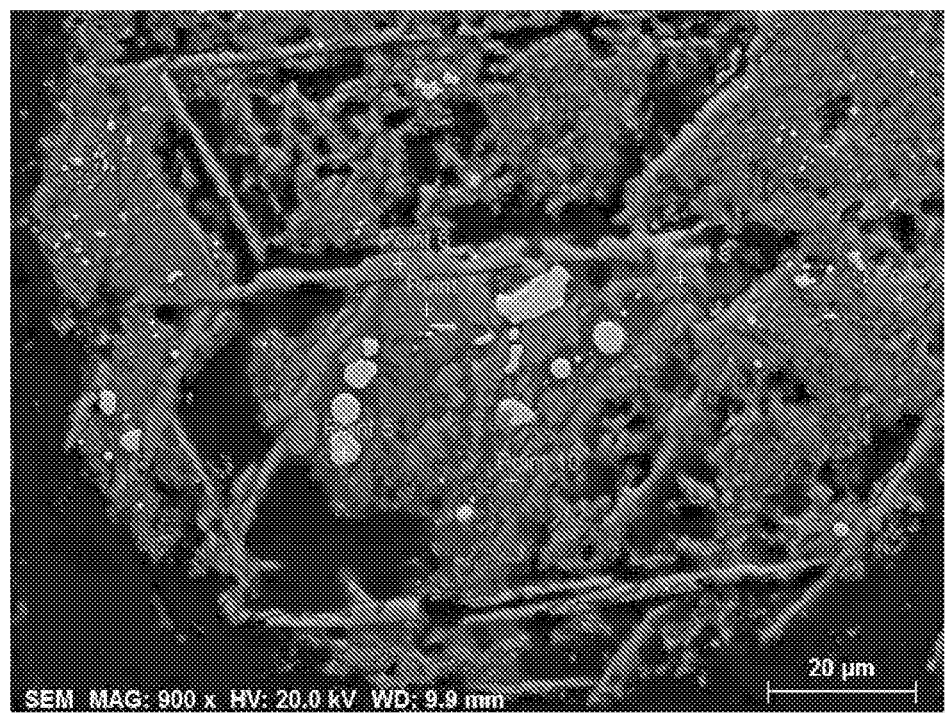
FIG. 7 is a SEM micrograph of a ferric chloride leach residue obtained from the ferric chloride leach of the concentrate reduced at 1050° C.

The residues were examined by SEM to identify the residue structures as well as the compositions. FIG. 7 is a SEM micrograph of the leach residue obtained from the ferric chloride leach of the magnetic concentrate reduced at 1050° C. FIG. 7 shows that the metallic iron has mostly been leached from the structure with only small globules of iron remaining (bright spot 5 in FIG. 7). The unleached metallic iron is generally less than 5 microns and encapsulated by the oxide phases. The remainder of the residue consists of calcium titanites (points 7 and 10 in FIG. 7) as well as iron titanium and titanium oxides (points 6, 8 and 9, FIG. 7).

Acid Leach Bench Scale Test Work

Samples for use in acid leach bench scale test work were prepared by dividing a 300 gram reduced concentrate (1050° C., 6.5 C ratio) into three samples for ferric chloride leaching (80° C., 35% w/w ferric chloride, 1 hour). These leaches produced an average iron extraction of 94.9%, with 2% vanadium and 0.1% titanium extracted, as shown in Table 4. Table 4 further shows that the ferric chloride leach extracted an amount of aluminium, magnesium and silicon.

TABLE 4

Metal Extraction from Reduced Iron by Ferric Chloride Leach

| Leach Test | Metal Extraction (%) | | | | | |
|---|---|---|---|---|---|---|
| | Fe | V | Ti | Al | Mg | Si |
| L4 | 95.1 | 2.0 | 0.1 | 33.9 | 10.9 | 6.8 |
| L5 | 94.6 | 2.0 | 0.1 | 40.0 | 11.1 | 7.4 |
| L6 | 95.1 | 2.0 | 0.1 | 33.9 | 10.9 | 6.8 |

The resulting ferric chloride leach residues were then combined and split into four samples for acid leach tests conducted using various acid concentrations. Table 5 shows the results from these acid leach tests.

TABLE 5

Metal Extraction from FeCl$_3$ Leach Residue by Acid Leach

| Leach Test | Leach Conditions | Metal Extraction (%) | | | | | |
|---|---|---|---|---|---|---|---|
| | | Fe | V | Ti | Al | Mg | Si |
| FR1 | 20% HCl | 57.7 | 5.3 | 4.3 | 10.0 | 27.4 | 0.2 |
| FR3 | 32% HCl | 58.6 | 31.9 | 29.3 | 28.8 | 43.6 | 0.1 |
| FR4 | 32% HCl & O$_2$ | 57.0 | 22.2 | 18.0 | 22.1 | 35.1 | 0.2 |
| FR5 | 49% H$_2$SO$_4$ | 75.1 | 42.1 | 36.3 | 33.8 | 48.6 | 0.1 |

Table 5 shows that the initial 20% HCl leach extracted 58% of the remaining iron in the ferric chloride leach residue and only 5.3% of the vanadium. Without being bound by theory, the unleached iron is considered to be present as acid resistant iron titanates, such as ilmenite. Furthermore, without being bound by theory, following reduction with coke, the higher titanium oxides contain higher vanadium concentrations and because the titanium oxides are more acid resistant, can cause the vanadium to be less amenable to the HCl leach.

Table 5 also shows that increasing the HCl concentration from 20% HCl to 32% at 80° C., increased the extraction of vanadium by a factor of six, while only a slight increase in iron extraction was observed. The titanium extraction increased by a similar factor, indicating that the vanadium is locked up by the titanium oxides.

An injection of oxygen into the 32% HCl leach was found to have a slightly negative effect on the extraction of all metals, as shown in Table 5. A 49% sulphuric acid leach was found to increase the extraction of vanadium and titanium, although the extractions were still below 50% (as shown in Table 5). Under these conditions of iron reduction, it is believed that the vanadium becomes refractory to the HCl leach as a result of carbide formation or locking within the iron-titanium oxides and is only partially leachable in sulphuric acid.

Figure 8:
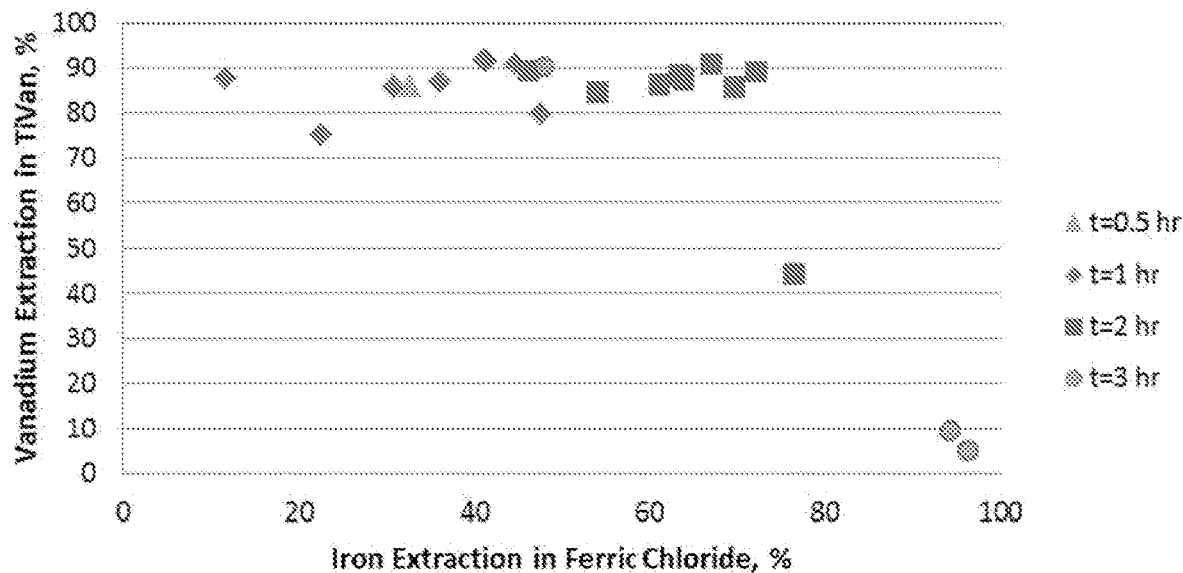
FIG. 8 is a graph of the extraction of vanadium in an acid leach as a function of the iron extraction during the ferric chloride leach.

FIG. 8 is a graph of the extraction of vanadium as a function of the iron extracted in the ferric chloride leach, being a measure of the amount of metallic iron formed during reduction. In FIG. 8, additional samples were tested with varying reduction conditions to determine the effect on iron extraction during the ferric leach step and vanadium extraction during the HCl acid leach step under atmospheric pressure. The results show that at higher carbon ratios (above 1.2 C), iron extraction in the ferric leach increases to about 95%, however the vanadium recovery decreases to less than 10% in the HCl acid leach step under atmospheric pressure. The results demonstrate that the preferred carbon ratio and residence time are 0.8-1.2 C and 2 hours, respectively. These preferred conditions provided an iron metallisation of between about 50 to 70%, whilst keeping the vanadium leachable in the HCl acid leach under atmospheric pressure.

Figure 9:
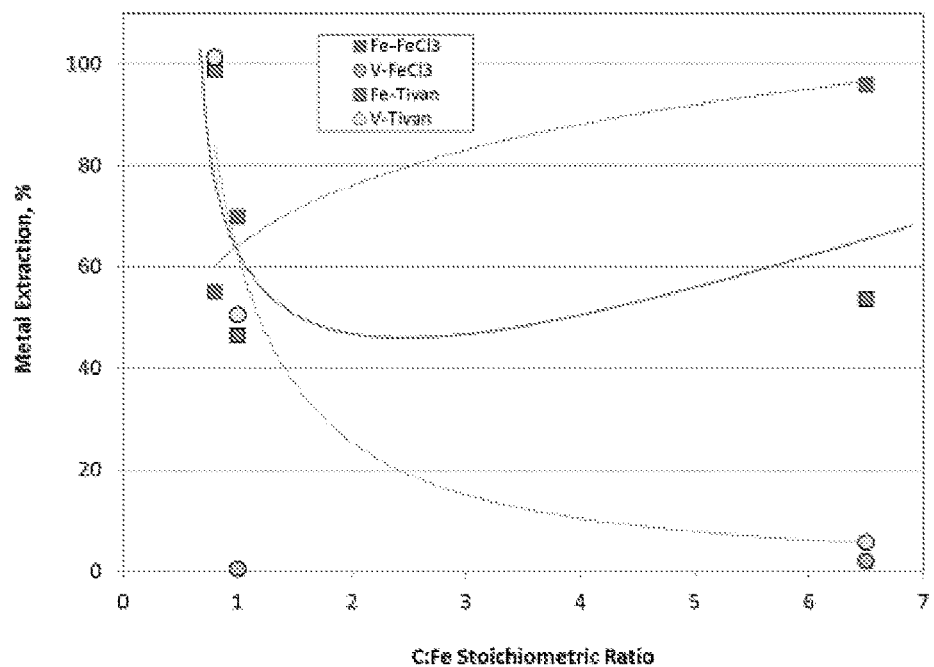
FIG. 9 is a graph of the effect of carbon:iron stoichiometric ratio on the leach behaviour of iron and vanadium in ferric chloride and HCl.

FIG. 9 shows the effect of the carbon:iron stoichiometric ratio on the leaching of iron and vanadium in ferric chloride and hydrochloric acid. The results in FIG. 9 indicate that the carbon ratio should be about 0.8 C for a maximum extraction of vanadium in the HCl leach. Furthermore, the results indicate that vanadium is not readily soluble in ferric chloride at any carbon ratio and that more iron, as metallic iron, is extracted in the ferric chloride leach at higher carbon ratios due to a higher metallisation extent.

The specific gravity (SG) of the HCl leach residue was determined to be 2.88 and the grade of a combined HCl leach residue from bench scale tests is given in Table 6. This leach residue was found to contain between 40 and 60% TiO$_2$ depending on the reduction and leaching conditions.

TABLE 6

Grade of Composite Bench Scale Test HCl Leach Residue (%)

| Fe | SiO$_2$ | Al$_2$O$_3$ | P | S | Mn | CaO | MgO | TiO$_2$ | V | LOI 371 | LOI 650 | LOI 1000 |
|---|---|---|---|---|---|---|---|---|---|---|---|---|
| 15.9 | 10.3 | 0.74 | 0.05 | 1.17 | 0.02 | 0.43 | 0.20 | 50.6 | 0.30 | 6.9 | 12.8 | 14.6 |

| Na$_2$O | Cr$_2$O$_3$ | Co | Ni | Cu | Zn | As | Ba | Cl | Pb | Sr | Zr |
|---|---|---|---|---|---|---|---|---|---|---|---|
| 0.20 | 0.42 | 0.001 | 0.006 | 0.02 | 0.02 | 0.00 | 0.01 | 0.25 | 0.03 | 0.01 | 0.03 |

Ferric Chloride Leach Pilot Plant Test Work

Ferric chloride leach pilot plant test work was conducted using reduced concentrates prepared at a carbon ratio of 0.8 C or 1.2 C at a temperature ranging between 920 to 1040° C.

The ferric leach was conducted at 80° C. in 35% ferric chloride solution for 2 hours wherein the total solids content was at 16%.

Figure 10:
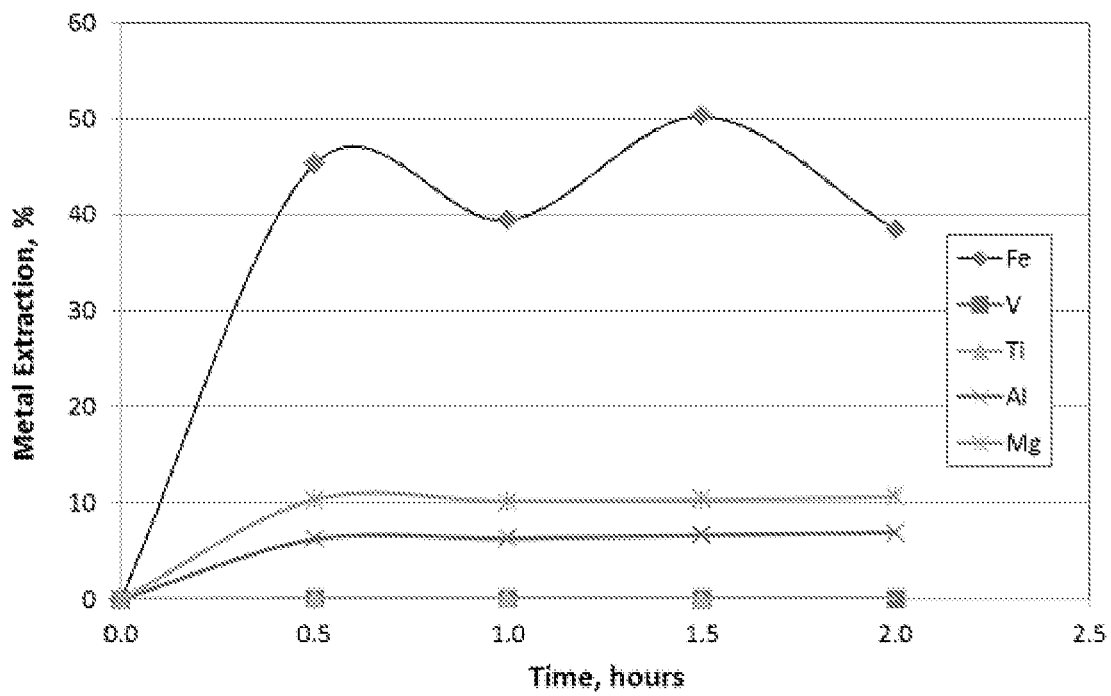
FIG. 10 is a graph of the extraction of iron, vanadium, titanium, aluminium and magnesium from a concentrate reduced at 1050° C. using a ferric chloride leach of 35% w/w $FeCl_3$, at 60° C. and 16% w/w solids content.

The leach residue grade and metal recoveries are shown in Table 6, Table 7 and FIG. 10. The results show that the leach was rapid with the reaction substantial complete after about 30 minutes. The leach residues were found to be similar in grade to the bench scale results, as shown in Table 7 and Table 8. The leach liquor in the bulk leaches for the pilot plant were found to be significantly lower in iron and titanium but higher in magnesium and silica compared with the bench scale liquors. This may be caused by the extended storage of the liquors, leading to precipitation of some iron and titanium and leaching of magnesium and silica.

TABLE 7

Ferric Chloride Bench Scale Test; 16% solids, 60° C., 35% FeCl$_3$

| Time | Solid Analysis % | | | | | | Liquor Analysis (mg/L) | | | | | |
|---|---|---|---|---|---|---|---|---|---|---|---|---|
| (hr) | Fe | V | Ti | Al | Mg | Si | Fe | V | Ti | Al | Mg | Si |
| 0 | 56.3 | 0.64 | 10.4 | 1.66 | 1.21 | 2.50 | 148411 | 2.1 | 9.3 | 89.2 | 31.0 | 70.2 |
| 0.5 | 46.0 | 0.84 | 13.4 | 1.91 | 1.52 | 2.89 | 217997 | 3.5 | 13.9 | 346.4 | 377.9 | 66.1 |
| 1.0 | 46.5 | 0.85 | 13.9 | 1.92 | 1.51 | 2.40 | 209207 | 3.4 | 12.0 | 349.4 | 370.9 | 68.4 |
| 1.5 | 44.9 | 0.82 | 13.3 | 1.91 | 1.48 | 3.13 | 225444 | 3.2 | 10.0 | 364.1 | 376.2 | 68.6 |
| 2.0 | 44.3 | 0.81 | 13.1 | 1.87 | 1.47 | 2.90 | 207744 | 3.4 | 8.5 | 375.1 | 387.7 | 66.1 |
| Final | 44.3 | 0.81 | 13.1 | 1.87 | 1.47 | 2.90 | 207744 | 3.4 | 8.5 | 375.1 | 387.7 | 66.1 |

TABLE 8

Bulk Ferric Chloride Residue - Pilot HCl Leach Feed

| Day | Solid analysis % | | | | | | Liquor Analysis (mg/L) | | | | | |
|---|---|---|---|---|---|---|---|---|---|---|---|---|
| | Fe | V | Ti | Al | Mg | Si | Fe | V | Ti | Al | Mg | Si |
| D1.2 | 42.1 | 0.89 | 13.7 | 2.20 | 1.22 | 2.62 | 67097 | 3.3 | 0.5 | 231.0 | 2367 | 101.7 |
| D2.1 | 45.7 | 0.89 | 13.8 | 2.12 | 1.21 | 2.36 | 53980 | 2.3 | 0.2 | 196.7 | 1970 | 116.1 |
| D2.2 | 44.3 | 0.91 | 14.5 | 2.27 | 1.08 | 3.16 | 62446 | 2.1 | 0.2 | 154.7 | 1985 | 97.6 |
| D3.1 | 44.6 | 0.85 | 13.4 | 2.07 | 1.23 | 3.00 | 55376 | 3.2 | 0.2 | 237.5 | 2069 | 115.7 |
| D3.2 | 44.5 | 0.90 | 14.4 | 2.29 | 1.18 | 2.97 | 74506 | 6.4 | 0.9 | 239.5 | 1095 | 62.7 |
| D4.1 | 43.0 | 0.89 | 14.1 | 2.11 | 1.06 | 2.35 | 97845 | 4.4 | 0.5 | 170.7 | 1486 | 97.5 |
| D4.2 | 43.9 | 0.87 | 16.1 | 2.18 | 1.02 | 3.16 | 65357 | 3.2 | 0.7 | 309.7 | 1698 | 111.6 |
| D5.1 | 42.6 | 0.85 | 14.3 | 2.15 | 1.33 | 3.22 | 77487 | 4.3 | 0.8 | 251.8 | 1795 | 103.0 |
| D5.2 | 43.4 | 0.88 | 15.6 | 2.23 | 1.18 | 3.40 | 74767 | 4.4 | 0.9 | 249.3 | 1782 | 97.2 |

FIG. 10 shows that about 90% of the metallic iron is extracted after 1 hour of leaching at 80° C. and that titanium and vanadium are minimally extracted (<0.04% and <0.5% respectively). Furthermore, the combined amount of aluminium and magnesium that is extracted is about 20%.

HCl Leach Pilot Plant Test Work

HCl leaching of the ferric chloride leach residue produced from the ferric chloride leach pilot plant test work was investigated.

Four 50 litre leach tanks were used for the HCl leach. The leach conditions of the HCl leach were 20% solids, 20% HCl, 80° C. and 8 hours residence time. In evaluating the acid regeneration options, it was determined that the strength of HCl leaving a regeneration circuit passed to the HCl leach would be 18% HCl. Table 9 below shows the leach results at 20% HCl compared with 18% HCl.

TABLE 9

Comparison with HCl leach at 20% and 18% HCl

| Time | Extraction % | | | | | | Liquor Analysis (mg/L) | | | | | |
|---|---|---|---|---|---|---|---|---|---|---|---|---|
| (hr) | Fe | V | Ti | Al | Mg | Si | Fe | V | Ti | Al | Mg | Si |
| 20% HCl | | | | | | | | | | | | |
| 0 | 0 | 0 | 0 | 0 | 0 | 0 | 0 | 0 | 0 | 0 | 0 | 0 |
| 1.0 | 94.0 | 98.4 | 4.3 | 82.9 | 84.9 | 4.8 | 123234 | 2517 | 1459 | 4487 | 2201 | 230 |
| 4.0 | 98.2 | 100.4 | 0.6 | 85.9 | 89.0 | 1.7 | 128689 | 2569 | 194 | 4653 | 2309 | 80 |
| 18% HCl | | | | | | | | | | | | |
| 0 | 0 | 0 | 0 | 0 | 0 | 0 | 0 | 0 | 0 | 0 | 0 | 0 |
| 2.0 | 96.3 | 97.9 | 2.9 | 79.2 | 91.9 | 1.3 | 113302 | 2642 | 668 | 4380 | 3686 | 63 |
| 4.0 | 96.3 | 98.2 | 0.9 | 79.5 | 91.8 | 0.6 | 114451 | 2678 | 218 | 4473 | 3691 | 34 |

The results in Table 9 indicate that this acid strength variation has minimal effect on the extraction of vanadium.

Although most of the HCl leach is over in the first 15 minutes, a leach residence time of 8 hours was employed in order to allow enough time for any dissolved titanium to hydrolyse and precipitate out of solution. The free acid at the end of the leach was about 10 to 40 g/L and the soluble titanium was less than about 10 ppm.

Specifically, the pilot plant HCl leach conducted on a leach residue taken from a pilot plant ferric leach, wherein ferric leach was carried out on a high carbon reduced concentrate (1.2 C) and a low carbon reduced concentrate (0.8 C).

The results showed that a high amount of titanium remained in solution at the end of the HCl leach (about 733 to 11962 ppm titanium compared with 44 to 118 ppm titanium for the low carbon reduced concentrate (0.8 C)). Without being bound by theory, this was considered to be due to more metallic iron being produced in the reduction step and hence more iron leached in the ferric chloride leach. This left a higher free acid at the end of the HCl leach resulting in the higher titanium in solution. It is believed that a high free acid stabilises the titanium in solution, inhibiting the hydrolysis reaction that precipitates $TiO_2$. Thus, for the 1.2 C reduced concentrate, the HCl leach conditions will require an increase in the percent of solids in order to use up this free acid to ensure the hydrolysis and precipitation of the titanium from solution. Thus, the conditions for the pilot plant HCl leach associated with the high carbon reduced concentrate (1.2 C) were adjusted to 28% solids and 17% HCl.

The pilot plant for the HCl leach was then run in two shifts per day for 5 days on the ferric chloride residue of the low carbon reduced concentrate (0.8 C) and three and a half days on the ferric chloride residue of the high carbon reduced concentrate (1.2 C). Day 6 of the test work was a period of switch over from the low carbon concentrate (0.8 C) to the high carbon concentrate (1.2 C).

Figure 11:
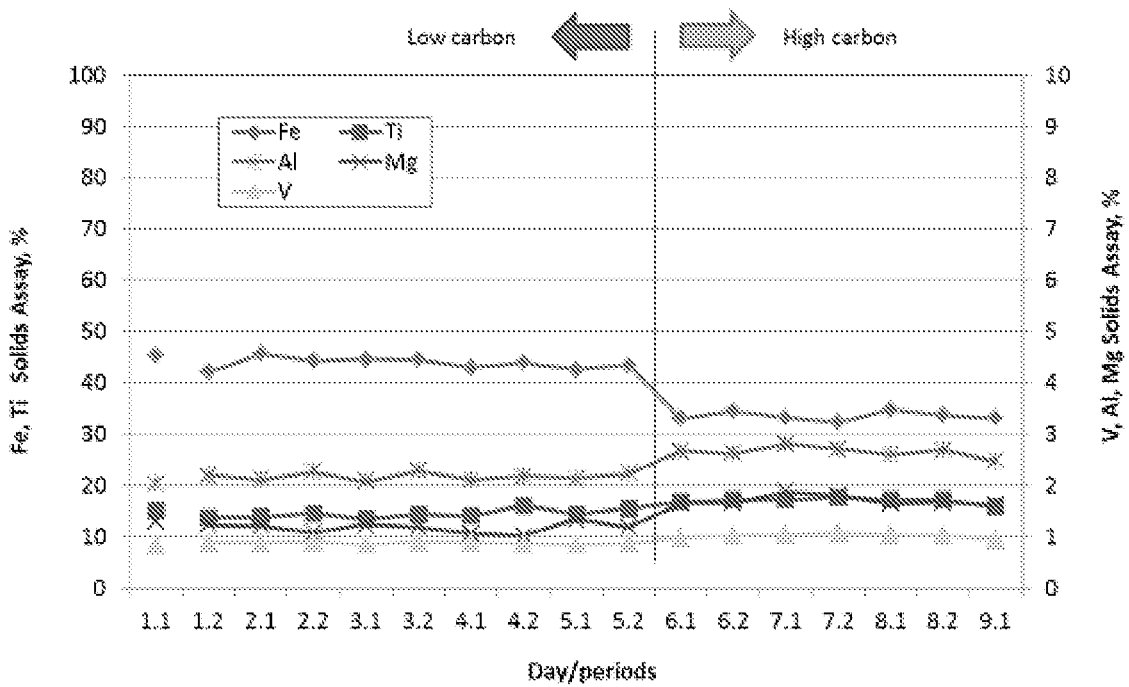
FIG. 11 is a graph of an assay of a ferric chloride leach residue for a low carbon (0.8 C) and high carbon (1.2 C) reduced concentrate.

FIG. 11 is a graph of the assay for a ferric chloride leach residue and shows that the low carbon reduced concentrate (0.8 C) had an average assay of 44.0% Fe, 14.5% Ti and 0.9% V. For the high carbon reduced concentrate (1.2 C), the ferric chloride leach residue had an average assay of 33.5% Fe, 17.0% Ti and 1.0% V. The greater reducing conditions of the 1.2 C reduced concentrates results in more iron in a subsequent ferric chloride leach to be extracted, leaving the ferric leach residue (which is used as a feed material for the HCl leach) to be lower in iron and higher in the remaining metals.

Figure 12:
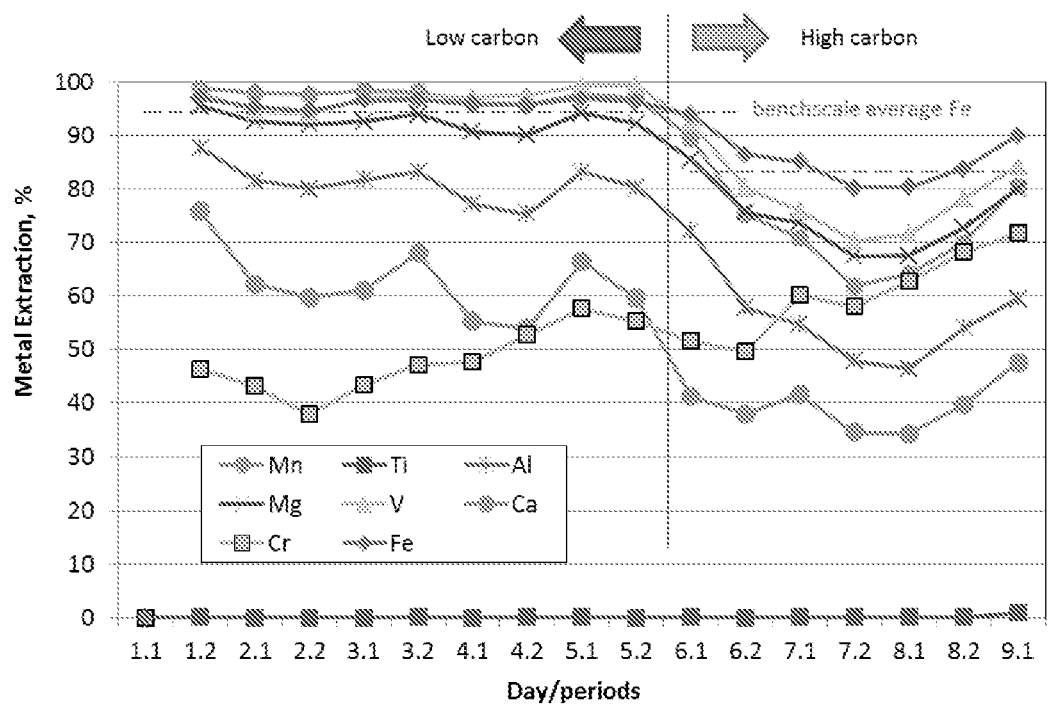
FIG. 12 is a graph of the extraction of metals using a HCl leach for the low carbon (0.8 C) and high carbon (1.2 C) reduced concentrates.

The extraction of metals in the HCl leach during the pilot plant test work is shown in FIG. 12 and Table 10. These results show a high extraction of iron and vanadium for the low carbon reduced concentrate (0.8 C), which is a marginally higher extraction than the average bench scale results for iron and vanadium with similar marginally lower titanium and aluminium extraction, but higher magnesium extraction.

TABLE 10

Extraction of Metals in HCl Leach for Pilot and Bench Scale Tests

| | Leach Extractions (%) | | | | |
|---|---|---|---|---|---|
| Day Period | Fe | V | Ti | Al | Mg |
| 1.1 | 0 | 0 | 0 | 0 | 0 |
| 1.2 | 96.9 | 97.9 | 0.1 | 87.7 | 95.5 |
| 2.1 | 95.3 | 94.5 | 0.1 | 81.6 | 92.5 |
| 2.2 | 94.6 | 93.8 | 0 | 80.1 | 91.9 |
| 3.1 | 96.6 | 97.1 | 0.1 | 81.7 | 92.6 |
| 3.2 | 96.7 | 97.2 | 0.1 | 83.2 | 93.9 |
| 4.1 | 95.8 | 97.1 | 0.1 | 77.1 | 90.6 |
| 4.2 | 95.7 | 97.5 | 0.1 | 75.3 | 90.1 |
| 5.1 | 96.8 | 99.2 | 0.1 | 83.1 | 94.1 |
| 5.2 | 96.3 | 99.3 | 0.1 | 80.3 | 92.1 |
| Pilot Ave. | 96.1 | 97.1 | 0.1 | 81.1 | 92.6 |
| Bench Ave. | 94.4 | 95.0 | 0.5 | 83.1 | 82.8 |
| 6.1 | 93.8 | 92.3 | 0.1 | 72.1 | 85.5 |
| 6.2 | 86.5 | 80.1 | 0.0 | 57.7 | 75.6 |
| 7.1 | 85.0 | 75.9 | 0.1 | 54.7 | 73.6 |
| 7.2 | 80.2 | 70.3 | 0.1 | 47.8 | 67.5 |
| 8.1 | 80.3 | 71.5 | 0.1 | 46.4 | 67.5 |

TABLE 10-continued

Extraction of Metals in HCl Leach for Pilot and Bench Scale Tests

| Day Period | Leach Extractions (%) | | | | |
| --- | --- | --- | --- | --- | --- |
| | Fe | V | Ti | Al | Mg |
| 8.2 | 83.8 | 78.1 | 0.2 | 53.9 | 72.6 |
| 9.1 | 90.0 | 84.1 | 0.9 | 59.5 | 80.0 |
| Pilot Ave. | 85.7 | 78.9 | 0.21 | 56.0 | 74.6 |
| Bench Ave. | 83.2 | 83.3 | 19.6 | 70.3 | 62.9 |

The extraction of these metals was found to be consistent over the 5 days of the pilot plant with standard deviations of 0.8% and 1.9% for iron and vanadium extractions, respectively.

For the high carbon reduced concentrate (1.2 C), the iron extraction was found to decrease to an average of about 85.7% as compared to the low carbon reduced concentrate (0.8 C), because more iron was removed in the ferric chloride leach stage. The vanadium extraction decreased further to an average of 78.9% due to the higher reducing conditions causing some of the vanadium to be converted into more refractory oxides. The average extraction for iron and vanadium were comparable with the bench scale results for the 1.2 C samples.

The extractions are more varied for the high carbon reduced concentrates during the trial, with standard deviations of 5.0% and 7.6% for iron and vanadium, respectively. The titanium extraction was kept low compared with the bench scale results by targeting a low free acid at the end of the leach by adjustment of the leach percent of total solids.

Figure 13:
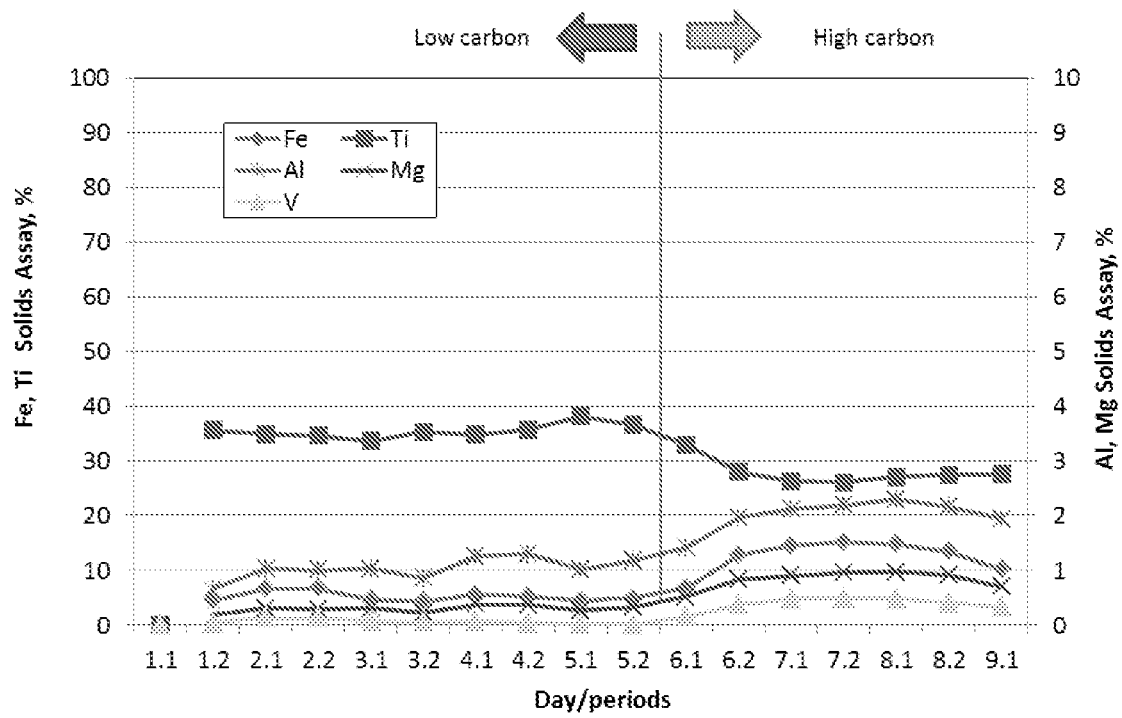
FIG. 13 is a graph of the average assay taken from the HCl leach residue of the low carbon (0.8 C) and high carbon (1.2 C) reduced concentrates.
Figure 14:
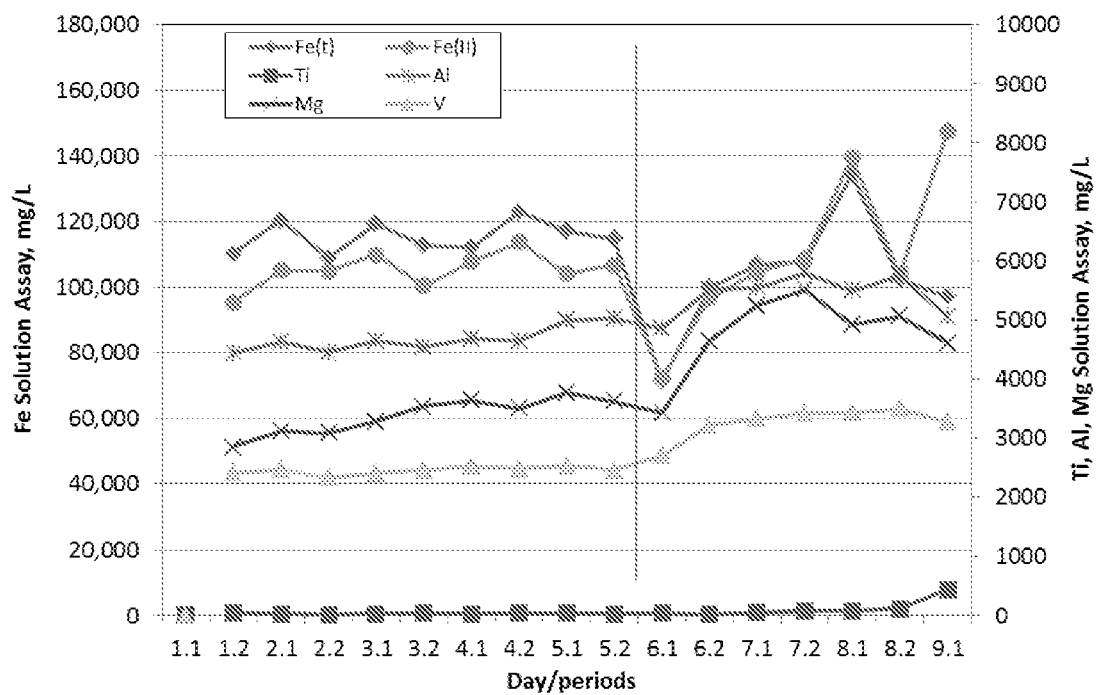
FIG. 14 is a graph of an assay of an HCl leach leachate for the low carbon (0.8 C) and a high carbon (1.2 C) reduced concentrates.

FIGS. 13 and 14 show the pilot plant HCl leach residue and leachate assays, respectively. The acid leachate assay is adjusted to compensate for the metal content of the liquor entrained in the feed so that it reflects only the metals dissolved by the HCl. This was done by subtracting the metal content of this liquor from the total metal content in the HCl leach feed.

Figure 15:
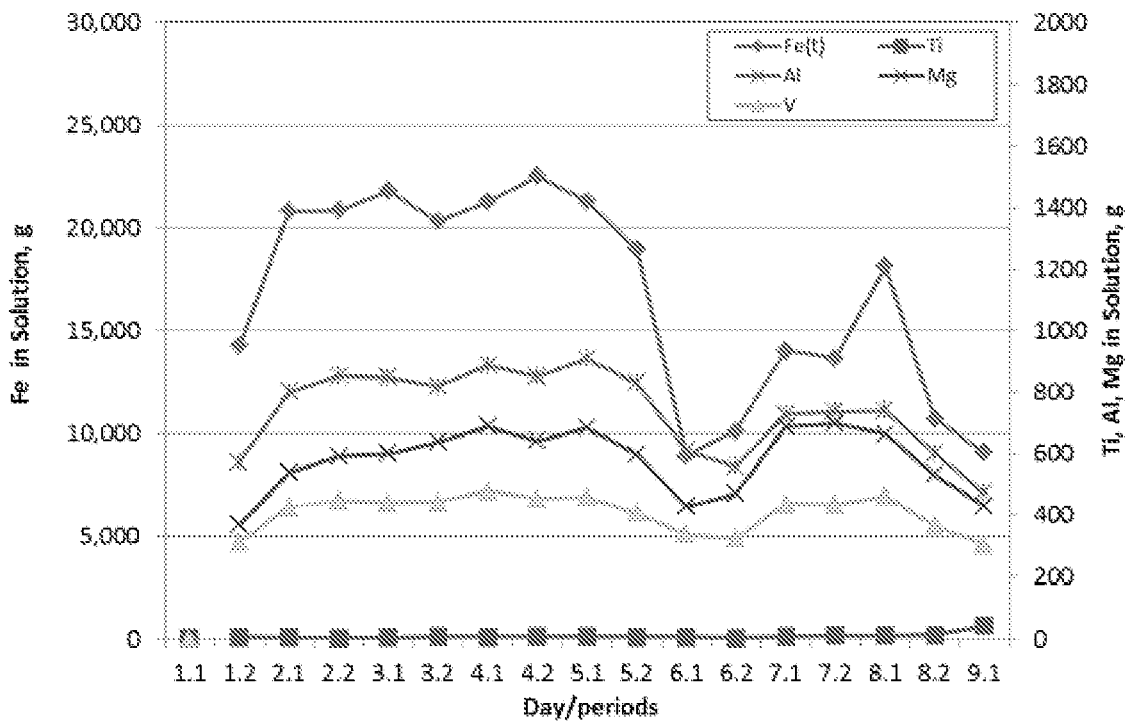
FIG. 15 is a graph of the amount of metals remaining in the HCl leachate after an HCl leach.

The correlation between the total iron and Fe(II) assays in the HCl leachate for the high carbon reduced concentrate (1.2 C) indicates that under the higher reduction conditions, the Fe(III) has been reduced to either metallic iron or Fe(II). The increase in HCl leachate concentration observed for most metals is due to the higher percent solids in the HCl leach feed, which comprises the ferric chloride residue, using a smaller liquor volume. However, except for iron, the total mass of metals leached is similar for the low and high reduced concentrates, except for the cross over period of day 6 and the end of the pilot plant trial, as shown in FIG. 15. There is less iron dissolved in the second part of the pilot plant test work as the high reduced concentrate (1.2 C) had more iron extracted in the ferric chloride leach.

Figure 16:
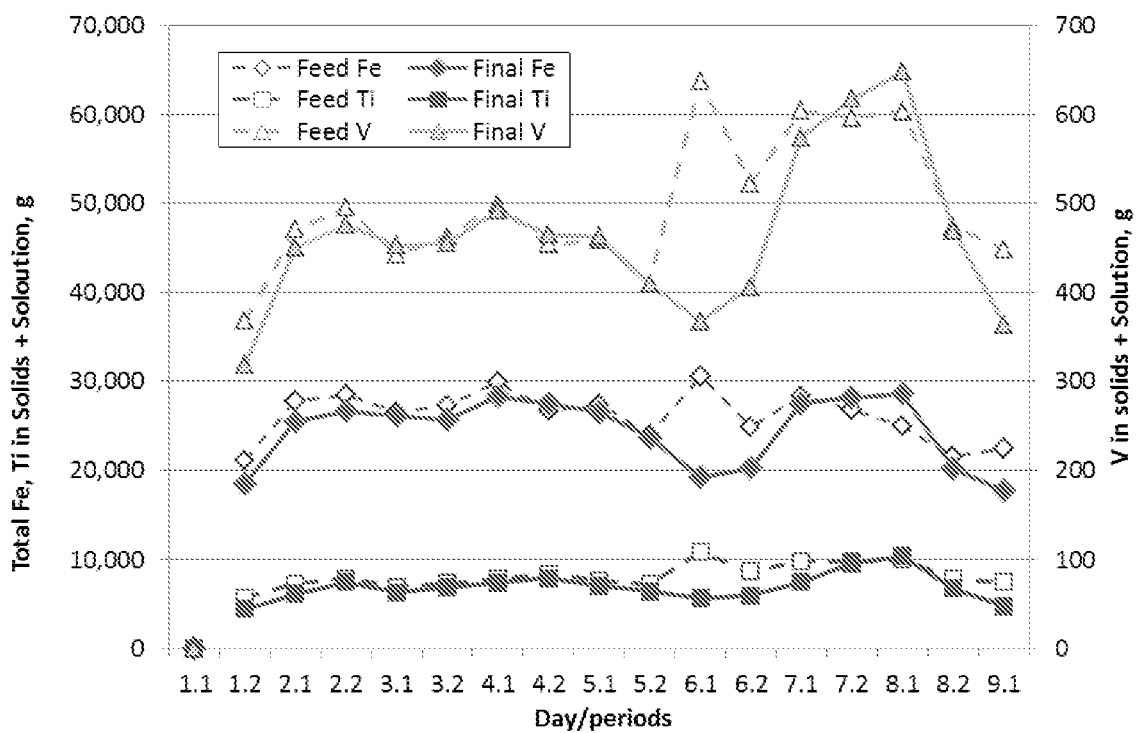
FIG. 16 is a graph of the mass balance of iron, titanium and vanadium in an HCl leach residue and HCl leachate.

FIG. 16 is a graph of the mass balance of iron, titanium and vanadium and shows that there is a reasonable correlation between iron, titanium and vanadium in the HCl leach feed compared with these metals in the final leach, with the exception of days 6 and 9, being the start and end of the high carbon reduced concentrate leach feed.

The HCl leach pilot plant demonstrated that high extractions of iron and vanadium and low extraction of titanium from a low carbon reduced concentrate could be achieved over a period of 5 days of continuous operation. However, high extractions of other metals were also observed, especially magnesium, manganese and aluminium.

For the high carbon reduced concentrate, the extraction results were lower and more variable as a result of the higher roast temperatures for these batches (about 1000 to 1030° C. compared with about 950 to 980° C.) and varying leach conditions. The percent solids content was adjusted to keep the free acid low at the end of the leach and, therefore maintain a low titanium concentration in solution. However, because of the low vanadium extractions observed, the acid level was increased to try and improve the extraction, which was achieved on days 8 and 9 of the pilot. This was complicated by the need to add some low carbon reduced concentrate, left over from the day 5 operation, on days 8 and 9 to have enough feed to keep the circuit running.

The HCl pilot plant test work demonstrated that to maintain high vanadium extraction in the HCl leach under atmospheric pressure, the iron reduction conditions need to be tightly controlled in terms of carbon ratio, residence time and temperature to achieve at least a 50% iron extraction in the ferric chloride leach.

Reduction of the HCl Leachate Bench Scale Test Work

Bench scale test work was conducted to investigate the oxidation-reduction potential of the HCl leachate prior to the step of solvent extraction.

The iron reduction of the HCl leachate was carried out in 0.5 L and 10 L reactor vessels for different iron reduction tests. The required amount of HCl leachate was transferred to the reactor and heated to about 50 to 60° C. in a water bath. Dry MgO powder was then added slowly to the reactor with high agitation to neutralise the free acid present in the HCl leachate. Specifically, the pH was adjusted to about 0.3 to 0.4 through the addition of MgO at a concentration of about 3 g/litre of leachate. The pH and Oxidation Reduction Potential (ORP) of the reactor mixture were then monitored online and samples were collected intermittently, filtered and analysed. Once the desired pH of the reactor mixture was obtained, an amount of iron powder was added and changes in the pH and ORP were recorded as a function of time. Iron powder was then added at a concentration of about 1.2 to 1.4 times the stoichiometric amount of iron required to reduce the oxidation state of iron from Fe(III) to Fe(II) and V(V) to V(IV) or V(III). A nitrogen blanket was provided immediately after the addition of iron powder to prevent atmospheric re-oxidation of ferrous ions. Further samples were collected intermittently, filtered and analysed. The pH and ORP of the filtrate was measured and ferrous content in the filtrate was analysed by standard dichromate titration.

Figure 17:
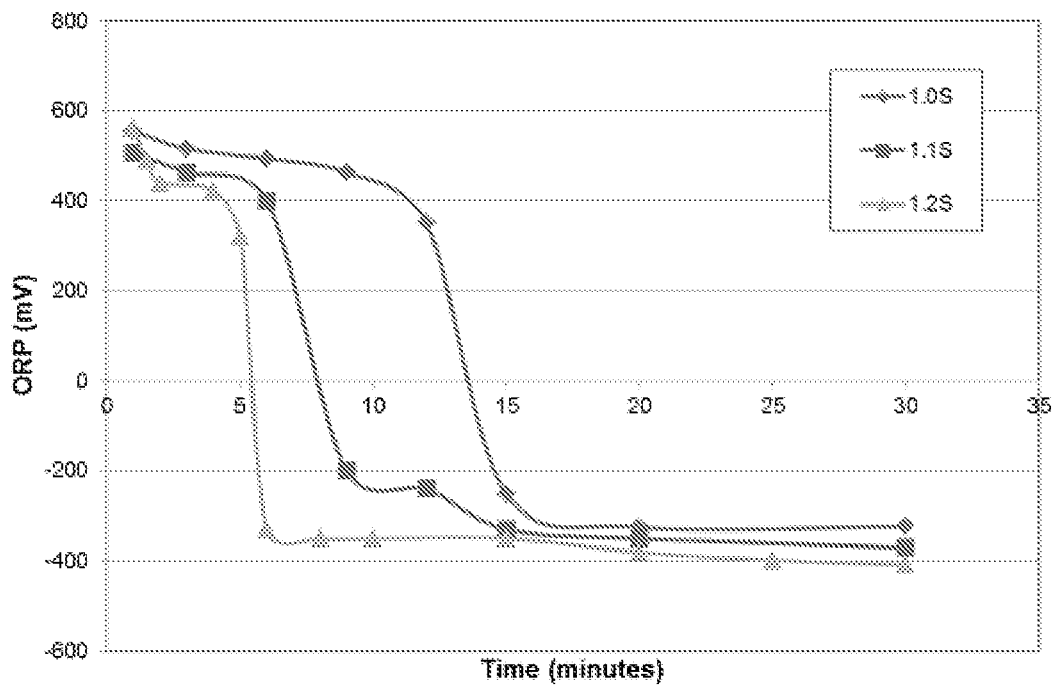
FIG. 17 is a graph of the redox potential of an HCl leachate as a function of time.

FIG. 17 is a graph of the ORP as a function of time and shows that there is a significant decrease in the redox potential of the HCl leachate due to the reduction of Fe(III) to Fe (II). FIG. 17 also shows that the greater the amount of iron powder added, the faster the reduction process.

Extraction Pilot Plant Test Work

An extraction pilot plant was setup comprising four solvent extraction mixer-settlers, two scrubbing stages, four vanadium stripping stages and two titanium stripping stages. The extraction pilot plant was run continuously for 8.5 days.

Solvent extraction tests were carried out in 1.0 litre stainless steel rectangular boxes immersed in a temperature controlled water bath. Overhead stirrers with 30 to 40 mm diameter impellers were used for mixing. The solution temperature was maintained at a desired temperature ±1° C. during the tests. The aqueous solution pH was continuously monitored and adjusted by addition of weak NaOH solutions or HCl solutions.

The initial conditions of the pilot plant are given in Table 11.

TABLE 11

Initial Solvent Extraction Pilot Plant Parameters

| | |
|---|---|
| Feed Rate | 30-40 L/h |
| Organic | Cyanex 272™, 10% v/v |
| Diluent | Shellsol D70 |
| Extraction Organic:Aqueous Ratio (O:A) | 1:1 |
| Temperature | 50° C. |
| Stripping Organic:Aqueous Ratio (O:A) | 15:1 |
| Stripping Solution | 3-5M HCl |
| Strip solution target | 50-60 g/L V |
| Extract/Strip Mixer Volume/Residence Time | 2 L/2 mins |
| Extract/Strip Settler Volume/Residence Time | 5 L/5 mins |
| Scrubbing unit feed rate (Organic/Aqueous) | 14.4 L/h/1.4 L/h |
| Scrubbing Organic:Aqueous Ratio (O:A) | 5:1 |
| Scrubber Mixer Volume/Residence | Time 2 L/2 mins |
| Scrubber Settler Volume/Residence Time | 5 L/5 mins |

Cyanex 272™ was supplied by Cytec Australia Holdings Pty Ltd. Shellsol D70™ diluent was provided by Viva Energy Australia Ltd.

Before use, the reduced acid leachate was pre-treated to ensure complete conversion of V(III) to V(IV) using air or weak $H_2O_2$ as the oxidant. This was undertaken to improve the extraction kinetics of vanadium onto the organic.

The solvent extraction mixer settlers had a combined mixer residence time of 8 minutes and a settling time of 20 minutes. The solvent extraction was carried out at a temperature of 50° C.

Figure 18:
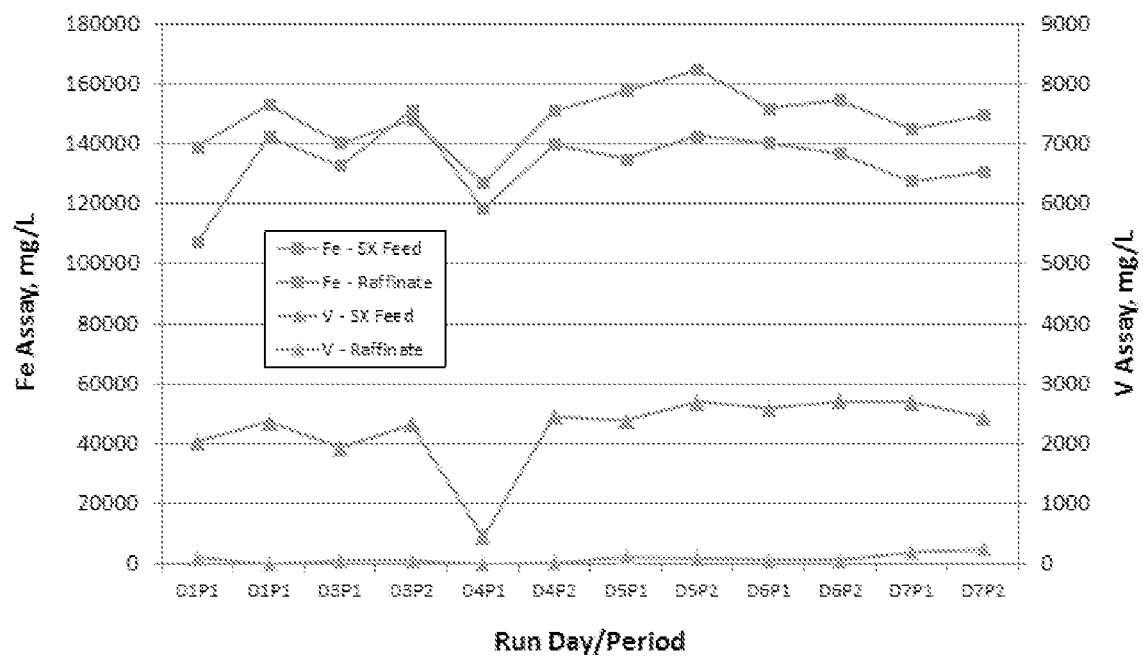
FIG. 18 is a graph of iron and vanadium solution assays of an HCl leachate and raffinate.

FIG. 18 is a graph of the solution assays of iron and vanadium taken from a solvent extraction feed in the form of the reduced leachate, and a raffinate (discharge). The vanadium content of the reduced leachate decreases considerably as the vanadium is extracted by the organic extractant. The concentration of any present iron is also seen to decrease, which may be due to some iron also being extracted by the organic extractant.

The low amount of vanadium in the solvent extraction feed on day 4, period 1, as shown in FIG. 18, corresponds to a sampling error resulting in the loss of vanadium from solution.

Figure 19:
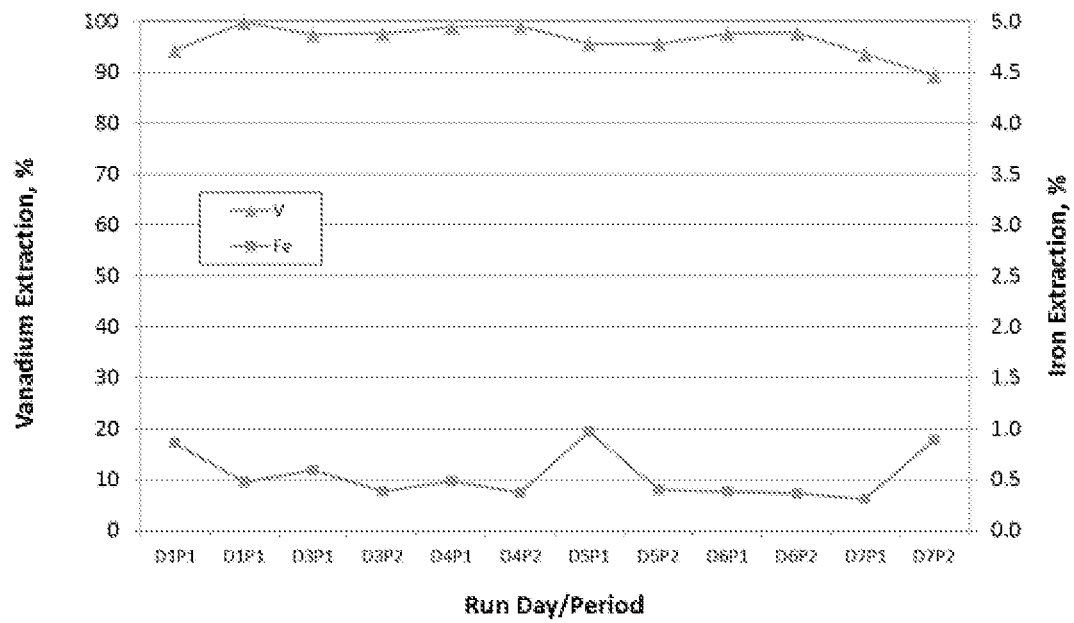
FIG. 19 shows a graph of the extraction of iron and vanadium during the solvent extraction pilot plant period.

The extraction of vanadium and iron over the pilot plant trial is plotted in FIG. 19. The results show that an average of 96.3% vanadium and 0.5% of iron is extracted over the pilot plant test period.

Following the solvent extraction steps, the scrubbing step was used to remove any impurities, such as Aluminium, present in the loaded organic extractant. The scrubbing step was conducted using a scrubbing agent that was a bleed from the loaded strip liquor. A spent scrub solution was then combined with the solvent extraction feed, while the scrubbed organic extractant progressed to the stripping circuit.

The scrubbed organic extractant from the scrubbing step was then sent to the vanadium stripping mixer-settler cells. The first stripping step comprised a two stage vanadium strip where the vanadium was stripped from the organic using 4M HCl at an A:O ratio of 1:15.

Figure 20:
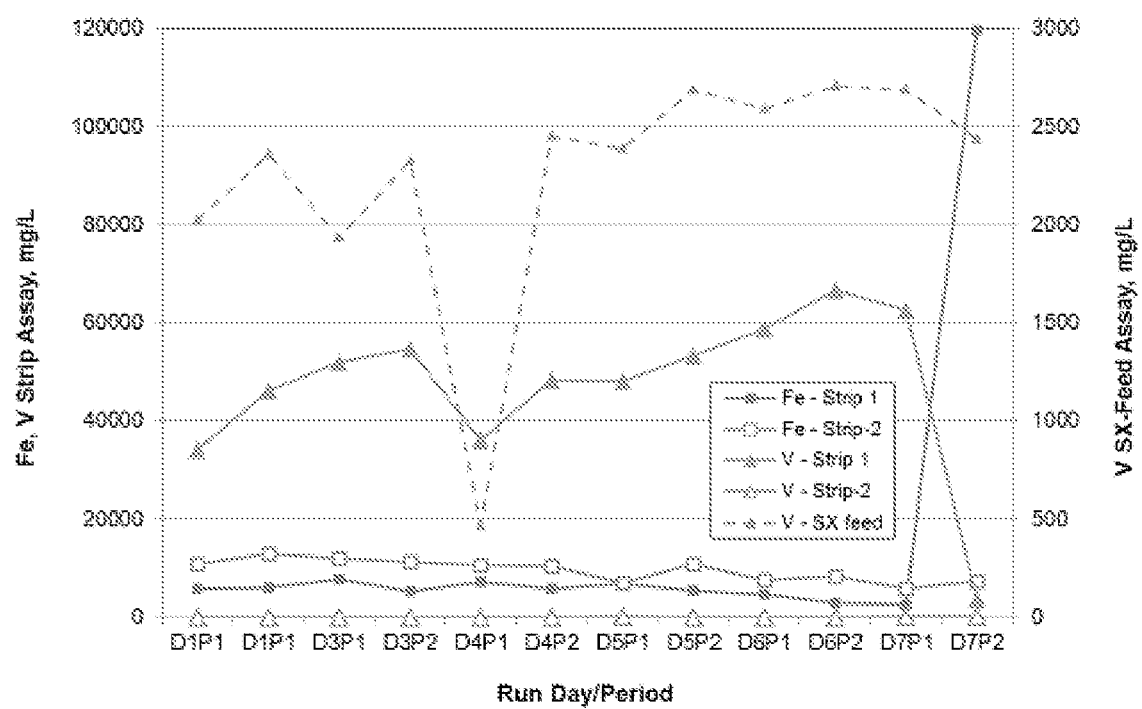
FIG. 20 is a graph of the iron and vanadium strip solution assay during the solvent extraction pilot plant period.

FIG. 20 shows the strip solution assays. The vanadium strip (referred to as Strip-1) extracted high concentrations of vanadium and a small amount of iron. A titanium strip (referred to as Strip-2) was carried out in two stages (mixer-settlers) using a solution of 2M HCl with 2% $H_2O_2$ at 50° C.

The A:O ratio in the titanium strip was 1:15. This stripping stage removed minimal vanadium and similar iron compared to the vanadium strip.

As can be seen from the above description, the method of the present invention produces a leach feed material containing vanadium and from which a substantial proportion of any iron present has been removed, and that is particularly suitable for passing to a leach by which a vanadium containing leachate is produced.

Modifications and variations such as would be apparent to the skilled addressee are considered to fall within the scope of the present invention.

The invention claimed is:

1. A method for preparing a leach feed material, the method comprising the steps of:
    passing an ore or concentrate containing vanadium and iron to a reduction step to form a reduced ore or concentrate; and
    passing the reduced ore or concentrate to a ferric leach step, conducted with ferric chloride in a concentration of between 20 to 40% w/w, to produce a ferric leachate containing iron and a ferric leach residue containing vanadium,
whereafter the ferric leach residue is used as a leach feed material for extracting and recovering vanadium.

2. The method according to claim 1, wherein the ore or concentrate contains titanium in addition to vanadium and iron.

3. The method according to claim 1, wherein the reduction step is conducted using:
    a. a carbon reductant; or
    b. coke.

4. The method according to claim 3, wherein the concentration of coke, expressed as a ratio to the stoichiometric amount of carbon required for iron reduction, is between:
    a. about 0.8 to 6.5; or
    b. about 0.8 to 1.2.

5. The method according to claim 4, wherein the stoichiometric ratio of carbon is 0.153 (mass of carbon:mass of concentrate).

6. The method according to claim 1, wherein the reduction step is conducted at a temperature range of between:
    a. about 900° C. to 1200° C.; or
    b. about 1000° C. to 1100° C.

7. The method according to claim 1, wherein the residence time of the reduction step ranges between
    a. about 1 to 3 hours; or
    b. about 2 hours.

8. The method according to claim 1, wherein the reduction step is conducted using reformed natural gas.

9. The method according to claim 1, wherein the percentage of metallised iron in the reduced ore or concentrate is between about 50 to 100%.

10. The method according to claim 1, wherein the concentration of ferric chloride ranges between:
    a. about 25 to 35% w/w; or
    b. about 35% w/w.

11. The method according to claim 1, wherein the ferric leach step is conducted at a temperature ranging between:
    a. about 25° C. to 100° C. under atmospheric pressure; or
    b. about 60° C. to 80° C. under atmospheric pressure.

12. The method according to claim 1, wherein the residence time of the ferric leach step ranges between:
   a. about 1 to 5 hours; or
   b. about 1 to 3 hours.

13. The method according to claim 1, wherein solids content during the ferric leach step ranges between:
   a. about 5 to 20% w/w; or
   b. about 8 to 14% w/w.

14. The method according to claim 1, wherein the method further comprises the step of:
   passing the ferric leach residue to a hydrochloric acid leach step to produce an acid leachate containing vanadium and an acid leach residue.

15. The method according to claim 14, wherein the acid leach residue contains titanium.

16. The method according to claim 14, wherein the concentration of HCl acid ranges between:
   a. about 15% to 32% (w/w); or
   b. about 15% to 20%.

17. The method according to claim 14, wherein the acid leach step is conducted under atmospheric pressure at a temperature ranging between:
   a. about 25° C. to 100° C.; or
   b. about 60° C. to 80° C.

18. The method according to claim 14, wherein the acid leach step conducted under pressure is conducted at a temperature ranging between:
   a. about 120° C. to 160° C.; or
   b. about 140° C. and 160° C.

19. The method according to claim 14, wherein the residence time of the acid leach step conducted under atmospheric pressure ranges between:
   a. about 0.5 to 10 hours; or
   b. about 6 and 8 hours.

20. The method according to claim 14, wherein the acid leach step conducted under pressure has a residence time ranging between:
   a. about 0.5 to 4 hours; or
   b. about 0.5 to 2 hours.

21. The method according to claim 14, wherein the solids content during the acid leach step ranges between:
   a. about 10 to 30% w/w; or
   b. about 15 to 20% w/w.

22. The method according to claim 14, wherein the free acid concentration at the end of the acid leach step ranges between about 10 to 40 g/L.

* * * * *